(12) United States Patent
Takahashi et al.

(10) Patent No.: US 11,770,595 B2
(45) Date of Patent: Sep. 26, 2023

(54) TRANSMISSION APPARATUS, TRANSMISSION METHOD, RECEPTION APPARATUS, AND RECEPTION METHOD

(71) Applicant: SATURN LICENSING LLC, New York, NY (US)

(72) Inventors: Kazuyuki Takahashi, Chiba (JP); Takeshi Ohno, Saitama (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 16/634,612

(22) PCT Filed: Jul. 27, 2018

(86) PCT No.: PCT/JP2018/028202
§ 371 (c)(1),
(2) Date: Jan. 28, 2020

(87) PCT Pub. No.: WO2019/031269
PCT Pub. Date: Feb. 14, 2019

(65) Prior Publication Data
US 2020/0275170 A1 Aug. 27, 2020

(30) Foreign Application Priority Data
Aug. 10, 2017 (JP) ................. 2017-156160

(51) Int. Cl.
*H04N 21/8358* (2011.01)
*H04H 60/23* (2008.01)
(Continued)

(52) U.S. Cl.
CPC ........ *H04N 21/8358* (2013.01); *H04H 60/23* (2013.01); *H04H 60/31* (2013.01); *H04N 21/84* (2013.01)

(58) Field of Classification Search
CPC .... H04N 21/8358; H04N 60/23; H04N 60/31; H04N 60/37; H04N 60/58; H04N 60/59;
(Continued)

(56) References Cited

U.S. PATENT DOCUMENTS 6,571,144 B1 * 5/2003 Moses .............. G11B 20/00086
704/E19.009
7,111,167 B1 * 9/2006 Yeung ................... H04L 9/3271
713/181
(Continued)

FOREIGN PATENT DOCUMENTS

| JP | 2006-311120 A | 11/2006 |
| JP | 2015-531189 A | 10/2015 |
| JP | 2017-11503 A | 1/2017 |

OTHER PUBLICATIONS

Extended European Search Report dated Jun. 18, 2020 in corresponding European Patent Application No. 18845008.4, 8 pages.
(Continued)

*Primary Examiner* — Greg C Bengzon
(74) *Attorney, Agent, or Firm* — Oblon, McClelland, Maier & Neustadt, L.L.P.

(57) ABSTRACT

The present technology relates to a transmission apparatus, a transmission method, a reception apparatus, and a reception method that make it possible to detect a watermark more easily. The transmission apparatus includes a generation section and a transmission section. The generation section generates watermark information for detecting a watermark. The transmission section transmits a broadcast signal including the watermark and the watermark information. When the transmission apparatus is provided, it enables the reception apparatus at a receiving end to detect the watermark more easily. The present technology is applicable, for example, to a transmission system including the transmission apparatus and the reception apparatus.

16 Claims, 32 Drawing Sheets

A4

| Syntax | No. of bits | Mnemonic | Remarks |
|---|---|---|---|
| WM_Service_information() { | | | WATERMARK INFORMATION |
|    watermark_service_flag | 1 | bslbf | FLAG INDICATING WHETHER WATERMARK SERVICE IS VALID |
|    reserved | 7 | bslbf | RESERVED FOR FUTURE USE |
| } | | | |

(51) Int. Cl.
*H04H 60/31* (2008.01)
*H04N 21/84* (2011.01)

(58) Field of Classification Search
CPC .... H04N 19/467; H04N 19/70; H04N 21/235; H04N 21/435; H04N 21/84; H04N 21/8586; H04N 21/4622; H04N 21/23892; H04N 21/44008; H04N 21/4627; H04N 21/4722; H04N 21/2353; H04N 21/4307; H04N 21/4856; H04N 19/174; H04N 19/48; H04N 1/32144; H04N 21/234327; H04N 21/2347; H04N 21/2362; H04N 21/2541; H04N 21/8352; H04N 21/8455; H04N 21/85406; H04N 19/102; H04N 19/105; H04N 19/117; H04N 19/119; H04N 19/124; H04N 19/159; H04N 19/167; H04N 19/176; H04N 19/18; H04N 19/182; H04N 19/187; H04N 19/40; H04N 19/46; H04N 19/503; H04N 19/61; H04N 19/625; H04N 19/63; H04N 16/65; H04N 19/85; H04N 1/3217; H04N 1/32187; H04N 1/32277; H04N 1/32309; H04N 1/3232; H04N 1/32331; H04N 1/387; H04N 2005/91335; H04N 21/00; H04N 21/2187; H04N 21/23418; H04N 21/2343; H04N 21/234309; H04N 21/234363; H04N 21/23439; H04N 21/2351; H04N 21/2355; H04N 21/23614; H04N 21/2383; H04N 21/262; H04N 21/26258; H04N 21/26291; H04N 21/4353; H04N 21/4355; H04N 21/437; H04N 21/43853; H04N 21/440263; H04N 21/4405; H04N 21/4408; H04N 21/47205; H04N 21/47214; H04N 21/4725; H04N 21/4728; H04N 21/478; H04N 21/488; H04N 21/4884; H04N 21/6125; H04N 21/6405; H04N 21/643; H04N 21/64715; H04N 21/6581; H04N 21/6587; H04N 21/812; H04N 21/8133; H04N 21/814; H04N 21/8173; H04N 21/835; H04N 21/8355; H04N 21/845; H04N 21/8545; H04N 21/858; H04N 5/08; H04N 5/74; H04N 5/913; H04N 7/08; H04N 7/0885; H04N 7/173; G06F 21/16; G06F 16/70; G06F 16/7837; G06F 21/10; G06F 21/64; H04H 60/23; H04H 20/31; H04H 20/91; H04H 20/93; H04H 60/13; H04H 60/14; H04H 60/31; H04H 60/37; H04H 60/58; H04H 60/59; H04H 60/82; H04L 2209/608; H04L 2209/24; H04L 63/12; H04L 9/14; H04L 9/3247; G06K 9/00744

See application file for complete search history.

(56) References Cited

U.S. PATENT DOCUMENTS

| | | | | |
|---|---|---|---|---|
| 8,320,606 B1* | 11/2012 | Moorer | ............... | G06T 1/0028 713/176 |
| 8,971,532 B1* | 3/2015 | Milstein | ............ | H04N 21/23476 380/201 |
| 9,131,264 B2 | 9/2015 | Oh et al. | | |
| 9,762,937 B2* | 9/2017 | Braness | ............ | H04N 21/23476 |
| 10,701,426 B1* | 6/2020 | van Hoff | ................ | G06F 3/012 |
| 10,770,087 B2* | 9/2020 | Kim | ..................... | G10L 19/008 |
| 2002/0027994 A1* | 3/2002 | Katayama | ........ | G11B 20/00891 704/E19.009 |
| 2003/0105950 A1* | 6/2003 | Hirano | ................ | G06F 21/6218 713/100 |
| 2003/0117920 A1* | 6/2003 | Sako | ............... | G11B 20/00405 369/47.12 |
| 2003/0226020 A1* | 12/2003 | Ripley | ..................... | H04N 7/16 348/E7.054 |
| 2004/0120404 A1 | 6/2004 | Sugahara et al. | | |
| 2005/0021970 A1* | 1/2005 | Reese | ................ | H04N 1/32288 713/176 |
| 2007/0064937 A1* | 3/2007 | Van Leest | ............ | H04N 19/176 375/E7.231 |
| 2008/0028474 A1* | 1/2008 | Horne | ................... | H04L 9/3247 726/27 |
| 2008/0215889 A1* | 9/2008 | Celik | ..................... | G06F 21/10 713/176 |
| 2008/0244351 A1* | 10/2008 | Kato | .................... | H04N 1/32149 358/405 |
| 2009/0013356 A1* | 1/2009 | Doerr | ............... | H04N 21/41407 725/62 |
| 2009/0252370 A1* | 10/2009 | Picard | .................. | H04N 19/467 382/100 |
| 2010/0177977 A1 | 7/2010 | Seshadri et al. | | |
| 2010/0313030 A1* | 12/2010 | Yang | .............. | H04N 21/234327 713/176 |
| 2011/0081041 A1* | 4/2011 | Sharma | ............. | H04N 1/00037 382/100 |
| 2011/0129114 A1* | 6/2011 | Colaitis | ................ | H04N 19/467 382/100 |
| 2011/0161086 A1* | 6/2011 | Rodriguez | ........... | G06T 1/0071 704/270 |
| 2011/0164784 A1* | 7/2011 | Grill | ............... | H04N 21/44008 382/100 |
| 2011/0314511 A1* | 12/2011 | Hartung | ......... | H04N 21/234327 725/151 |
| 2012/0045089 A1* | 2/2012 | Ramos | .................. | G06F 3/0482 382/100 |
| 2012/0093356 A1 | 4/2012 | Seshadri et al. | | |
| 2012/0154633 A1* | 6/2012 | Rodriguez | ........ | H04M 1/72454 707/769 |
| 2012/0243727 A1* | 9/2012 | Hwang | .................. | H04N 5/913 382/100 |
| 2012/0265735 A1* | 10/2012 | McMillan | ........ | H04N 21/44204 707/687 |
| 2013/0007790 A1* | 1/2013 | McMillan | ............... | H04H 60/43 725/14 |
| 2013/0096926 A1* | 4/2013 | Maling, III | ........ | H04N 21/4852 704/500 |
| 2013/0148843 A1* | 6/2013 | Doerr | ............... | H04N 21/23892 382/100 |
| 2013/0276046 A1* | 10/2013 | Park | .................... | H04N 21/4622 725/110 |
| 2013/0332989 A1* | 12/2013 | Dabbiere | ................ | G06F 21/10 726/1 |
| 2014/0013374 A1* | 1/2014 | Oh | ........................ | G06T 1/0042 725/112 |
| 2014/0026195 A1* | 1/2014 | Marshall | ............. | G06F 21/6227 726/4 |
| 2014/0047475 A1* | 2/2014 | Oh | ..................... | H04N 21/8586 725/40 |
| 2014/0068686 A1* | 3/2014 | Oh | ...................... | H04N 21/6543 725/93 |
| 2014/0089959 A1* | 3/2014 | Oh | ......................... | H04H 60/33 725/24 |
| 2014/0108803 A1* | 4/2014 | Probert | .................. | G06F 21/54 713/170 |
| 2014/0233716 A1* | 8/2014 | Villette | .................. | H04M 3/568 379/202.01 |
| 2014/0245339 A1* | 8/2014 | Zhang | ................ | H04N 21/4398 725/18 |
| 2014/0250479 A1* | 9/2014 | Lee | .................... | H04N 21/8358 725/110 |
| 2015/0078551 A1* | 3/2015 | Kitahara | ............ | H04N 21/2541 380/211 |

(56) References Cited

U.S. PATENT DOCUMENTS

| | | | | |
|---|---|---|---|---|
| 2015/0324947 | A1* | 11/2015 | Winograd | G06F 16/9566 |
| | | | | 382/100 |
| 2015/0326393 | A1* | 11/2015 | Takashima | H04N 21/8358 |
| | | | | 380/30 |
| 2016/0057317 | A1* | 2/2016 | Zhao | H04N 21/00 |
| | | | | 348/515 |
| 2016/0148334 | A1* | 5/2016 | Petrovic | H04N 21/2353 |
| | | | | 382/100 |
| 2016/0150297 | A1* | 5/2016 | Petrovic | H04N 19/65 |
| | | | | 725/25 |
| 2016/0182973 | A1* | 6/2016 | Winograd | H04N 21/4722 |
| | | | | 725/25 |
| 2016/0269765 | A1* | 9/2016 | Mandyam | H04N 21/8586 |
| 2016/0328398 | A1* | 11/2016 | Adams | G06F 9/445 |
| 2017/0048528 | A1* | 2/2017 | Filippov | H04N 19/159 |
| 2017/0109858 | A1* | 4/2017 | Jiang | G06T 1/0057 |
| 2017/0116697 | A1* | 4/2017 | Kato | G06T 1/0071 |
| 2017/0118540 | A1* | 4/2017 | Thomas | H04N 19/167 |
| 2017/0316189 | A1* | 11/2017 | Winograd | G06T 1/005 |
| 2017/0372445 | A1* | 12/2017 | Nielsen | G06Q 30/0201 |
| 2018/0048743 | A1* | 2/2018 | Misra | H04L 69/324 |
| 2018/0077456 | A1* | 3/2018 | Kitahara | H04N 21/25891 |
| 2018/0082700 | A1* | 3/2018 | Eronen | H04R 3/005 |
| 2018/0146245 | A1* | 5/2018 | Petrovic | G06T 1/005 |
| 2018/0167630 | A1* | 6/2018 | Zhao | H04N 21/44008 |
| 2018/0242052 | A1* | 8/2018 | Ng | H04N 21/8358 |
| 2018/0253567 | A1* | 9/2018 | Gonzalez-Banos | |
| | | | | H04N 1/32144 |
| 2018/0350356 | A1* | 12/2018 | Garcia | G10L 15/22 |
| 2018/0357742 | A1* | 12/2018 | Henry | H04N 19/467 |
| 2018/0359513 | A1* | 12/2018 | Deshpande | H04N 21/812 |
| 2018/0376156 | A1* | 12/2018 | Deshpande | H04N 21/8358 |
| 2019/0007752 | A1* | 1/2019 | Deshpande | H04N 21/812 |
| 2019/0026444 | A1* | 1/2019 | Yamagishi | G06F 21/16 |
| 2019/0069043 | A1* | 2/2019 | Ng | H04N 21/44008 |
| 2019/0116395 | A1* | 4/2019 | Kerdranvat | H04N 21/8106 |
| 2019/0132652 | A1* | 5/2019 | Zhao | H04N 21/23892 |
| 2019/0335213 | A1* | 10/2019 | Bieber | H04N 21/23897 |
| 2020/0014988 | A1* | 1/2020 | Navali | H04N 21/234309 |
| 2020/0045368 | A1* | 2/2020 | Eyer | H04N 21/8358 |
| 2020/0077159 | A1* | 3/2020 | Deshpande | H04N 21/643 |
| 2020/0128303 | A1* | 4/2020 | Zhao | H04N 21/8358 |
| 2020/0186894 | A1* | 6/2020 | Thorwirth | H04N 21/23439 |
| 2022/0417617 | A1* | 12/2022 | Zhao | H04N 21/434 |

OTHER PUBLICATIONS

International Search Report dated Oct. 16, 2018 in PCT/JP2018/028202 citing documents therein, 1 page.

ATSC Standard: "Interactive Services Standard, A/105", Oct. 29, 2015, 22 pages.

ATSC Standard: "Audio Watermark Emission, A/334", Sep. 19, 2016.

ATSC Standard: "Content Recovery in Redistribution Scenarios, A/336", Jun. 5, 2017.

\* cited by examiner

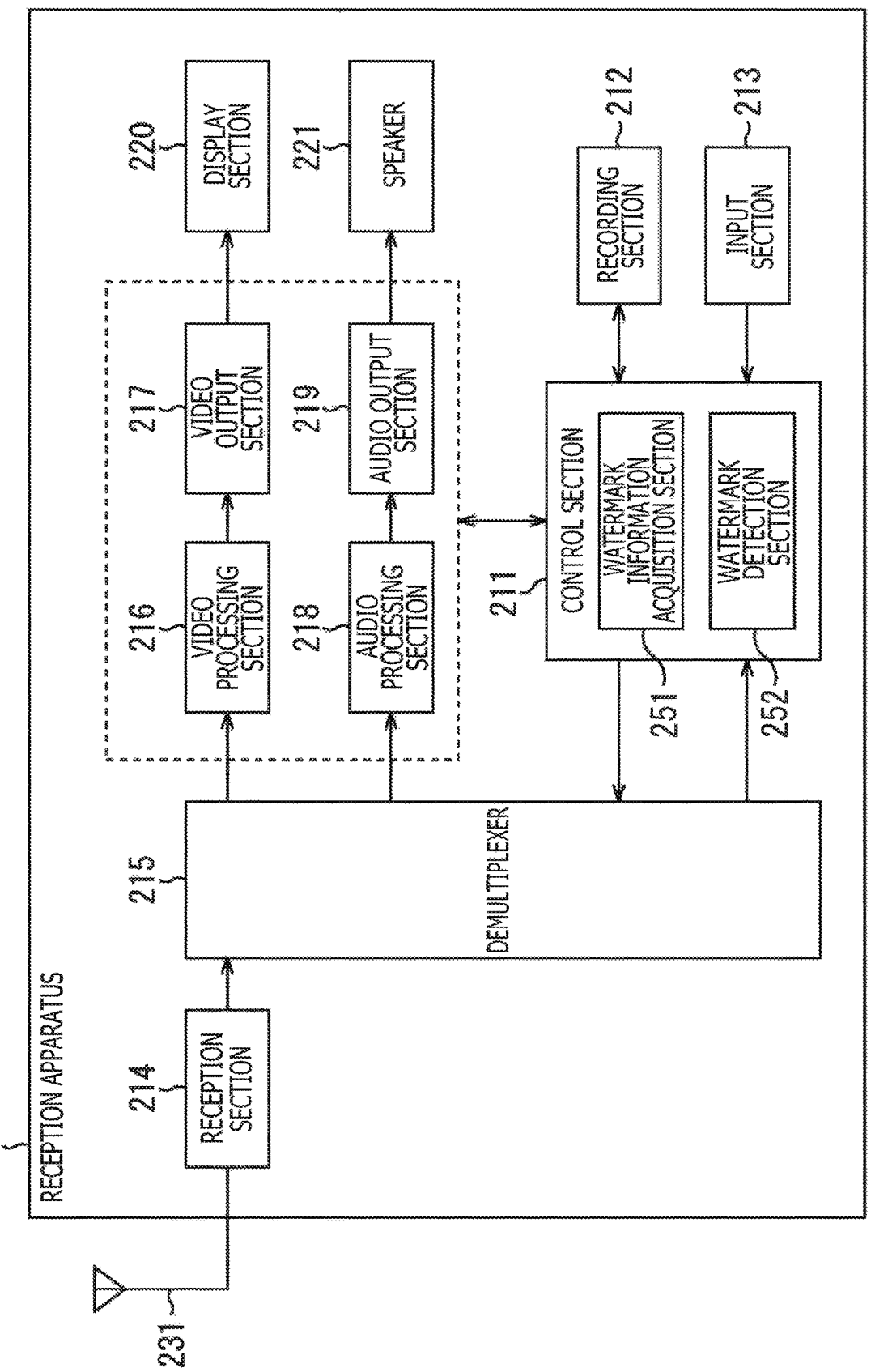

FIG. 4

| NO. | LAYER | | WATERMARK INFORMATION TRANSMISSION METHOD | CHARACTERISTICS |
|---|---|---|---|---|
| 1 | AUDIO LAYER | 1-1 | METADATA (MPEG-H 3D Audio) | • ADD WATERMARK INFORMATION TO AUDIO DATA. |
| | | 1-2 | USER DATA (MPEG-H 3D Audio) | |
| 2 | VIDEO LAYER | 2-1 | USER DATA (MPEG-2) | • ADD WATERMARK INFORMATION TO VIDEO DATA. |
| | | 2-2 | USER DATA (MPEG4-AVC/HEVC) | |
| 3 | SYSTEM LAYER | 3-1 | SIGNALING (ATSC 3.0) | • TRANSMIT WATERMARK INFORMATION AS CONTROL INFORMATION TO IDENTIFY INFORMATION NECESSARY FOR SYSTEM LAYER. |
| | | 3-2 | PSI (PMT) (MPEG2-TS) | |

FIG. 7

| Syntax | No. of bits | Mnemonic |
|---|---|---|
| object_metadata_efficient() {  ← A2<br>    intracoded_object_metadata_efficient();  ← A3<br>    has_differential_metadata;<br>    if(has_differential_metadata) {<br>        differential_object_metadata();<br>    }<br>} | 1 | bslbf |

FIG. 8

| Syntax | No. of bits | Mnemonic |
|---|---|---|
| intracoded_object_metadata_efficient() {    if period:    if(num_objects>1){       common_azimuth;       if(common_azimuth){          default_azimuth;       }       else{          for(o=0;o<num_objects;o++){             position_azimuth[o];          }       }       common_elevation;       if(common_elevation){          default_elevation;       }       else{          for(o=0;o<num_objects;o++){             position_elevation[o];          }       }       common_radius;       if(common_radius){          default_radius;       }       else{          for(o=0;o<num_objects;o++){             position_radius[o];          }       }       common_gain;       if(common_gain){          default_gain;       }       else{          for(o=0;o<num_objects;o++){             gain_factor[o];          }       }       common_spread;       if(common_spread){          default_spread;       }       else{          for(o=0;o<num_objects;o++){             spread[o];          }       }       if(hasDynamicObjectPriority){          common_dynamic_object_priority;          if(common_dynamic_object_priority){             default_dynamic_object_priority;          }          else{             for(o=0;o<num_objects;o++){                dynamic_object_priority[o];             }          }       }    }    else{       position_azimuth;       position_elevation;       position_radius;       gain_factor;       spread;       if(hasDynamicObjectPriority){          dynamic_object_priority;       }    }    Service_information() } |  <br>8<br>1<br>8<br><br><br>8<br><br><br><br>1<br>8<br><br><br>6<br><br><br><br>1<br>4<br><br><br>4<br><br><br><br>1<br>7<br><br><br>7<br><br><br><br>1<br>7<br><br><br>7<br><br><br>1<br>3<br><br><br>3<br><br><br><br><br>8<br>6<br>4<br>7<br>7<br><br>3 |  <br>uimsbf<br>bslbf<br>tcimsbf<br><br><br>tcimsbf<br><br><br><br>bslbf<br>tcimsbf<br><br><br>tcimsbf<br><br><br><br>bslbf<br>uimsbf<br><br><br>uimsbf<br><br><br><br>bslbf<br>tcimsbf<br><br><br>tcimsbf<br><br><br><br>bslbf<br>uimsbf<br><br><br>uimsbf<br><br><br>bslbf<br>uimsbf<br><br><br>uimsbf<br><br><br><br><br>tcimsbf<br>tcimsbf<br>uimsbf<br>tcimsbf<br>uimsbf<br><br>uimsbf |

F I G. 9

| Syntax | No. of bits | Mnemonic | Remarks |
|---|---|---|---|
| WM_Service_information() { | | | WATERMARK INFORMATION |
| watermark_service_flag | 1 | bslbf | FLAG INDICATING WHETHER WATERMARK SERVICE IS VALID |
| reserved | 7 | bslbf | RESERVED FOR FUTURE USE |
| } | | | |

A4 (arrow pointing to WM_Service_information())

FIG. 10

| usacExtElementType | The concatenated usacExtElementSegmentData represents: |
|---|---|
| ID_EXT_ELE_FILL | Series of fill_byte |
| ID_EXT_ELE_MPEGS | SpatialFrame() |
| ID_EXT_ELE_SAOC | SaocFrame() |
| ID_EXT_ELE_AUDIOPREROLL | AudioPreRoll() |
| ID_EXT_ELE_UNI_DRC | uniDrcGain() as defined in ISO/IEC 23003-4 |
| ID_EXT_ELE_OBJ_METADATA | object_metadata() |
| ID_EXT_ELE_SAOC_3D | Saoc3DFrame() |
| ID_EXT_ELE_HOA | HOAFrame() |
| ID_EXT_ELE_FMT_CNVRTR | FormatConverterFrame() |
| ID_EXT_ELE_USERDATA | user_data() |
| unknown | unknown data. The data block shall be discarded. |

F I G. 11

| usacExtElementType | Value |
|---|---|
| ID_EXT_ELE_FILL | 0 |
| ID_EXT_ELE_MPEGS | 1 |
| ID_EXT_ELE_SAOC | 2 |
| ID_EXT_ELE_AUDIOPREROLL | 3 |
| ID_EXT_ELE_UNI_DRC | 4 |
| ID_EXT_ELE_OBJ_METADATA | 5 |
| ID_EXT_ELE_SAOC_3D | 6 |
| ID_EXT_ELE_HOA | 7 |
| ID_EXT_ELE_FMT_CNVRTR | 8 |
| /* reserved for ISO use */ | 9-127 |
| ID_EXT_ELE_USERDATA | 128 |
| /* reserved for use outside of ISO scope */ | higher |

NOTE: Application-specific usacExtElementType values are mandated to be in the space reserved for use outside of ISO scope. These are skipped by a decoder as a minimum of structure is required by the decoder to skip these extensions.

F I G. 12

| Syntax | No. of bits | Format |
|---|---|---|
| userdataConfig() { | | |
| userdata_identifier | 32 | uimsbf |
| userdata_frame_length | 16 | uimsbf |
| userdata() | var | |
| } | | |

| Syntax | No. of bits | Format |
|---|---|---|
| ATSC_user_data() { | | |
|   user_data_type_code | 8 | uimsbf |
|   user_data_type_structure() | | |
| } | | |

B2 → ATSC_user_data()
B3 → user_data_type_structure()

FIG. 15

| user_data_type_code value | user_data_type_structure () |
|---|---|
| 0x00-0x02 | ATSC Reserved |
| 0x03 | MPEG_cc_data() (as defined in Table 6.10) |
| 0x04-0x05 | ATSC Reserved |
| 0x06 | bar_data() (as defined in Section 6.2.3.2) |
| 0x07 | WM_Service_information() |
| 0x08-0xFF | ATSC Reserved |

FIG. 16

| Syntax | No. of bits | Mnemonic | Remarks |
|---|---|---|---|
| WM_Service_information() { | | | WATERMARK INFORMATION |
|   watermark_service_flag | 1 | bslbf | FLAG INDICATING WHETHER WATERMARK SERVICE IS VALID |
|   reserved | 7 | bslbf | RESERVED FOR FUTURE USE |
| } | | | |

| | No. of bits | Mnemonic |
|---|---|---|
| video_sequence() { | | |
|    next_start_code() | | |
|    sequence_header() | | |
|    if(nextbits()==extension_start_code) { | | |
|      sequence_extension() | | |
|      do { | | |
|        extension_and_user_data(0) | | |
|        do { | | |
|          if(nextbits()==group_start_code) { | | |
|            group_of_pictures_header() | | |
|            extension_and_user_data(1) | | |
|          } | | |
|          picture_header() | | |
|          picture_coding_extension() | | |
|          extensions_and_user_data(2) | | |
|          picture_data() | | |
|        } while((nextbits()==picture_start_code) \|\| | | |
|          (nextbits()==group_start_code)) | | |
|        if(nextbits()!=sequence_end_code) { | | |
|          sequence_header() | | |
|          sequence_extension() | | |
|        } | | |
|      } while(nextbits()!=sequence_end_code) | | |
|    } else { | | |
|      /* ISO/IEC 11172-2 */ | | |
|    } | | |
|    sequence_end_code | 32 | bslbf |
| } | | |

C1

FIG. 19

| Syntax | No. of bits | Format |
|---|---|---|
| user_data() {  |  |  |
| user_data_start_code | 32 | bslbf |
| user_data_identifier | 32 | bslbf |
| user_structure() |  |  |
| } |  |  |

C2 → user_data()

0x47413934 ("GA94")
ATSC_user_data()

user_structure() → C3

F I G. 21

| Syntax | No. of bits | Mnemonic | Remarks |
|---|---|---|---|
| WM_Service_information() { | | | WATERMARK INFORMATION |
|   watermark_service_flag | 1 | bslbf | FLAG INDICATING WHETHER WATERMARK SERVICE IS VALID |
|   reserved | 7 | bslbf | RESERVED FOR FUTURE USE |
| } | | | |

| Syntax | No. of bits | Format |
|---|---|---|
| user_data_registered_itu_t_t35() { | | |
|   itu_t_t35_country_code | 8 | bslbf |
|   itu_t_t35_provider_code | 16 | bslbf |
|   user_identifier | 32 | bslbf |
|   user_structure() | | |
| } | | |

0x47413934 ("GA94")
ATSC1_data()

| Syntax | No. of bits | Mnemonic | Remarks |
|---|---|---|---|
| WM_Service_information() { | | | WATERMARK INFORMATION |
|   watermark_service_flag | 1 | bslbf | FLAG INDICATING WHETHER WATERMARK SERVICE IS VALID |
|   reserved | 7 | bslbf | RESERVED FOR FUTURE USE |
| } | | | |

| Element or Attribute Name | | | Use | Data Type | Description |
|---|---|---|---|---|---|
| BundleDescriptionROUTE | | | | | Root element of the User Service Bundle Description for ROUTE/DASH. |
| | UserServiceDescription | | 1 | | A single instance of an ATSC 3.0 Service. |
| | | @globalServiceId | 0..1 | anyURI | A globally unique URI that identifies the ATSC 3.0 Service. This attribute is optional for the ESG and EAS services. |
| | | @serviceId | 1 | unsignedShort | Reference to corresponding service entry in the (SLT). |
| | | @serviceStatus | 0..1 | boolean | Specify the status of this service as active or inactive. |
| | | Name | 0..N | string | Name of the ATSC 3.0 service. |
| | | @lang | 1 | lang | Language of the ATSC 3.0 service name. |
| | | ServiceLanguage | 0..N | lang | Available languages of the ATSC 3.0 service. |
| | | DeliveryMethod | 0..N | | Container of transport-related information pertaining to the contents of the service over broadcast and (optionally) broadband modes of access. This element is not applicable to and therefore shall be absent for ESG and EAS services. |
| | | BroadcastAppService | 0..N | | A DASH Representation delivered over broadcast containing the corresponding media component(s) belonging to the ATSC 3.0 Service. |
| | | BasePattern | 1..N | string | A character pattern for use by the ATSC receiver to match against any portion of the Segment URL used by the DASH Client to request DASH Media Segments of a parent DASH Representation. |
| | | UnicastAppService | 0..N | | A DASH Representation delivered over broadband containing the constituent media content component(s) belonging to the ATSC 3.0 Service. |
| | | BasePattern | 1..N | string | A character pattern for use by the ATSC receiver to match against any portion of the Segment URL used by the DASH Client to request DASH Media Segments of a parent DASH Representation. |
| | | VideoWaterMarkService | 0..1 | boolean | A video watermark delivered over video data. |
| | | AudioWaterMarkService | 0..1 | boolean | A audio watermark delivered over audio data. |

F I G . 2 6

| Element and Attribute Names | | | Use | Data Type | Description |
|---|---|---|---|---|---|
| S-TSID | | | | | Service Transport Session Instance Description |
| RS | | | 1..N | | ROUTE session |
| | @sIpAddr | | 0..1 | stsid:IPv4addressType | Source IP address of this ROUTE session; mandatory for ROUTE session other than session carrying SLS (session signaled in SLT);defaults to session carrying SLS. |
| | @dIpAddr | | 0..1 | stsid:IPv4addressType | Destination IP address of this ROUTE session; mandatory for ROUTE session other than session carrying SLS (session signaled in SLT);defaults to session carrying SLS. |
| | @dport | | 0..1 | unsignedShort | Destination port of this ROUTE session; mandatory for ROUTE session other than session carrying SLS (session signaled in SLT);defaults to session carrying SLS. |
| | LS | | 1..N | | LCT channel |
| | | @tsi | 1 | unsignedInt | TSI value |
| | | @bw | 0..1 | unsignedInt | Maximum bandwidth |
| | | @startTime | 0..1 | dateTime | Start time |
| | | @endTime | 0..1 | dateTime | End time |
| | | @VideoWaterMarkService | 0..1 | boolean | A video watermark delivered over video data. |
| | | @AudioWaterMarkService | 0..1 | boolean | A audio watermark delivered over audio data. |
| | | SrcFlow | 0..1 | stsid:srcFlowType | Information about the source flow |
| | | RepairFlow | 0..1 | stsid:rprFlowType | Information about the repair flow |

FIG. 27

| Element or Attribute Name | Use | Data Type | Description |
|---|---|---|---|
| BundleDescriptionMMT | | | Root element of the User Service Bundle Description for MMTP. |
|   UserServiceDescription | 1 | | A single instance of an ATSC 3.0 Service. |
|     @serviceId | 1 | unsignedShort | Reference to corresponding service entry in LLS(SLT). |
|     @serviceStatus | 0..1 | boolean | Specify the status of this service as active or inactive. |
|     ComponentInfo | 0..N | | Contains information about components available in the service. For each component includes information about component type, component role, component name, component identifier, component protection flag. |
|       @componentType | 1 | unsignedByte | Attribute indicates the type of this component. |
|       @componentRole | 1 | unsignedByte | Attribute indicates the role or kind of this component. |
|       @componentProtectedFlag | 0..1 | boolean | Attribute indicates if this component is protected. |
|       @componentId | 1 | string | Attribute indicates the identifier of this component. |
|       @componentName | 0..1 | string | Attribute indicates the human readable name of this component. |
|       @VideoWaterMarkService | 0..1 | boolean | A video watermark delivered over video data. |
|       @AudioWaterMarkService | 0..1 | boolean | A audio watermark delivered over audio data. |

FIG.28

| Syntax | No. of bits | Mnemonic |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for(i=0;i<N;i++) { | | |
|         descriptor() | | |
|     } | | |
|     for(i=0;i<N1;i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for(i=0;i<N2;i++) { | | |
|             descriptor() | | |
|         } | | |
|     } | | |
|     CRC_32 | 32 | rpchof |
| } | | |

E1: ADD WM_component_descriptor() TO ES LOOP.

F I G. 29

| Syntax | No. of bits | Mnemonic | Remarks |
|---|---|---|---|
| WM_component_descriptor () ← E1 | | | |
| description_tag | 8 | uimsbf | |
| description_length | 8 | uimsbf | |
| watermark_service_type | 8 | uimsbf | TYPE INFORMATION INDICATING WHETHER WATERMARK SERVICE IS VALID |
| } | | | |

FIG.30

| watermark_service_type | Description |
|---|---|
| 0x00 | WATERMARK SERVICE NOT PROVIDED |
| 0x01 | WATERMARK SERVICE PROVIDED |
| 0x02-0xff | RESERVED FOR FUTURE USE |

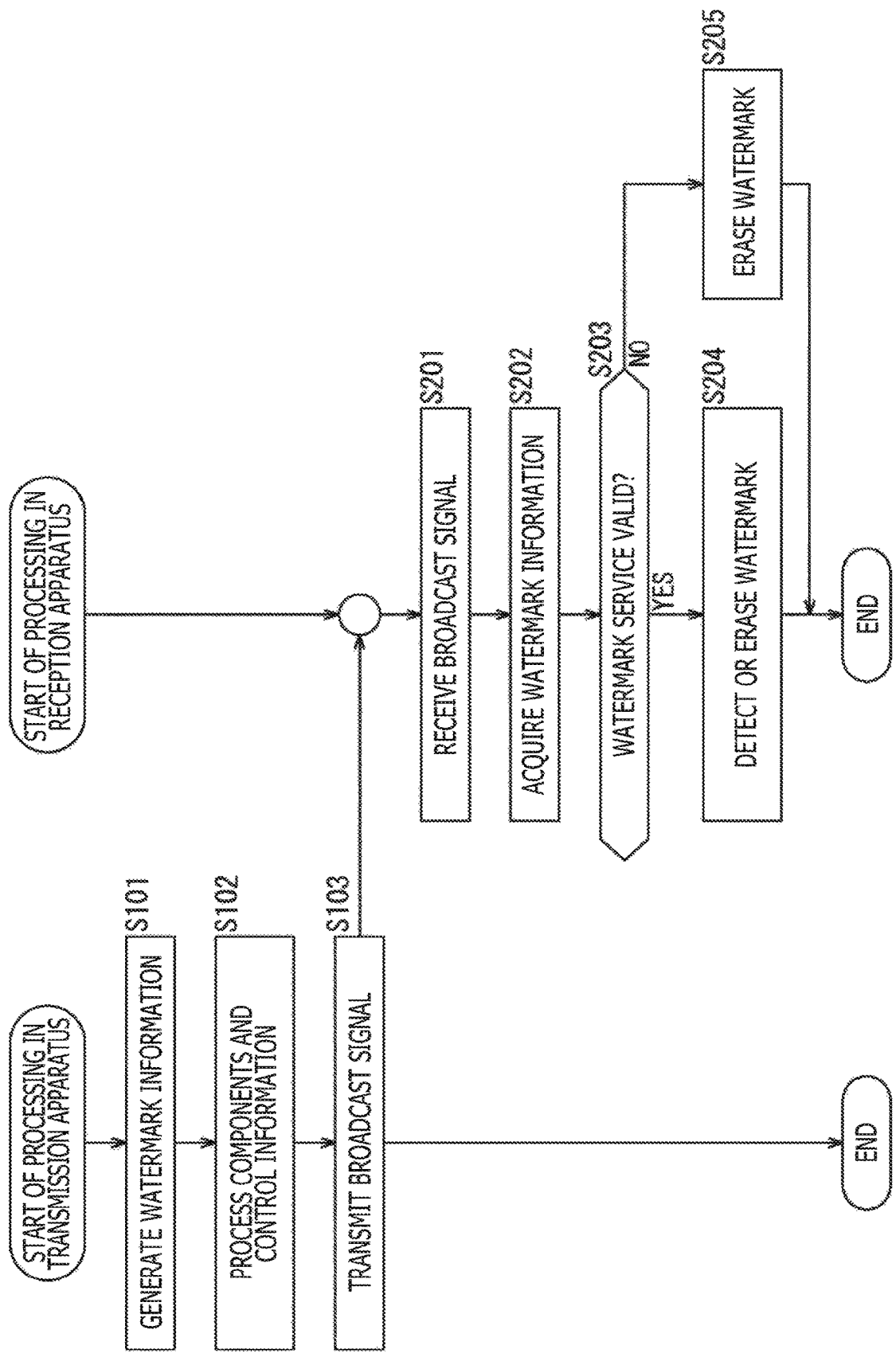

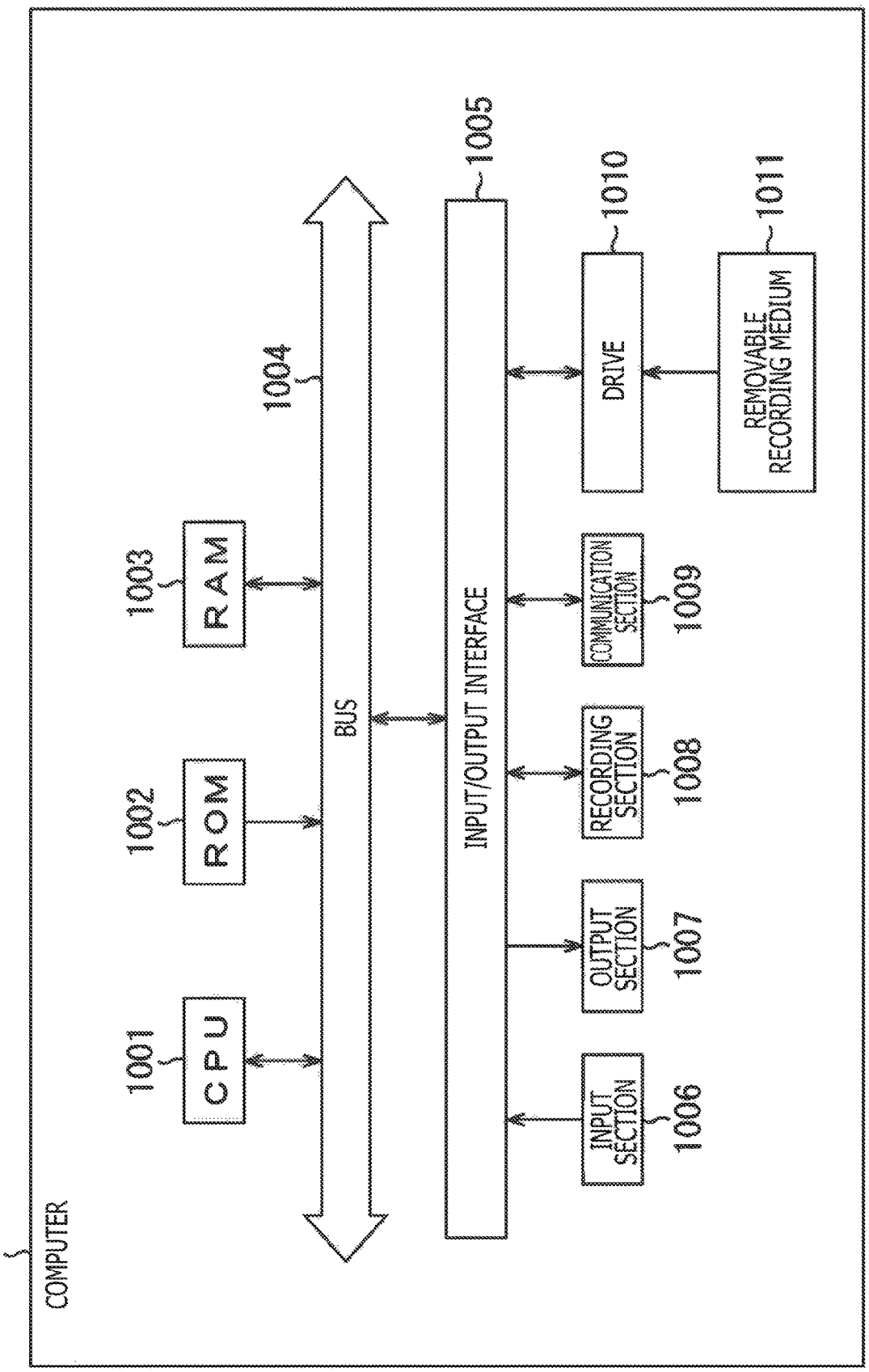

TRANSMISSION APPARATUS, TRANSMISSION METHOD, RECEPTION APPARATUS, AND RECEPTION METHOD

TECHNICAL FIELD

The present technology relates to a transmission apparatus, a transmission method, a reception apparatus, and a reception method. More particularly, the present technology relates to a transmission apparatus, a transmission method, a reception apparatus, and a reception method that are capable of detecting a watermark more easily.

BACKGROUND ART

There is a known technology for transmitting various kinds of information by using a watermark such as a video watermark or an audio watermark (refer, for example, to PTL 1).

For example, video watermarks make it possible to use two or more upper lines of a video display region of one video frame as a watermark in order to transmit data representative of information the amount of which is based on bits allocated to the associated region.

CITATION LIST

Patent Literature

[PTL 1]
  JP 2017-011503 A

SUMMARY

Technical Problem

Now, a video watermark is included in video data and then transmitted. Therefore, the video watermark might disturb a user's viewing when it is displayed on a screen of a receiver such as a television receiver. Therefore, in a case where a video watermark is to be valid, it is preferred that a signal of the video watermark be erased after the video data is decoded. In order to erase such a signal, however, it is necessary to use a function (special function) for detecting that a video watermark is included in the video data.

Further, when an audio watermark is used, a watermark signal (a signal different from an ordinary signal) embedded in audio data is to be detected by using a DSP (Digital Signal Processor) or other similar arithmetic circuit. Therefore, it is necessary to use a function (special function) for detecting the audio watermark included in the audio data.

As described above, under present circumstances, in order to use a watermark such as a video watermark or an audio watermark, it is necessary for a receiver to have a special function for detecting the watermark. It is therefore demanded that a proposal for detecting a watermark more easily be made.

The present technology has been made in view of the above circumstances, and makes it possible to detect a watermark more easily.

Solution to Problem

A transmission apparatus according to a first aspect of the present technology includes a generation section and a transmission section. The generation section generates watermark information for detecting a watermark. The transmission section transmits a broadcast signal including the watermark and the watermark information.

A transmission apparatus according to the first aspect of the present technology may be an independent apparatus or an internal block constituting one apparatus. Further, a transmission method according to the first aspect of the present technology is a transmission method corresponding to the above-mentioned transmission apparatus according to the first aspect of the present technology.

The transmission apparatus and transmission method according to the first aspect of the present technology generate watermark information for detecting a watermark, and transmit a broadcast signal including the watermark and the watermark information.

A reception apparatus according to a second aspect of the present technology includes a reception section and a detection section. The reception section receives a broadcast signal including a watermark and watermark information for detecting the watermark. The detection section detects, on the basis of the watermark information, the watermark included in the broadcast signal.

The reception apparatus according to the second aspect of the present technology may be an independent apparatus or an internal block constituting one apparatus. Further, a reception method according to the second aspect of the present technology is a reception method corresponding to the above-mentioned reception apparatus according to the second aspect of the present technology.

The reception apparatus and reception method according to the second aspect of the present technology receive a broadcast signal including a watermark and watermark information for detecting the watermark, and detect, on the basis of the watermark information, the watermark included in the broadcast signal.

Advantageous Effect of Invention

According to the first and second aspects of the present technology, it is possible to detect a watermark more easily.

It should be noted that the above-described advantage is merely illustrative and not restrictive. The present technology may provide any advantages described in this document.

BRIEF DESCRIPTION OF DRAWINGS

FIG. 3 is a block diagram illustrating an exemplary configuration of a reception apparatus.

FIG. 4 is a diagram illustrating exemplary methods of watermark information transmission.

FIG. 7 is a diagram illustrating exemplary syntax of object_metadata_efficient( ).

FIG. 8 is a diagram illustrating exemplary syntax of intracoded_object_metadata_efficient( ).

FIG. 9 is a diagram illustrating exemplary syntax of WM_Service_information( ).

FIG. 10 is a diagram illustrating exemplary extensions of usacExtElementType.

FIG. 11 is a diagram illustrating exemplary values of usacExtElementType.

FIG. 12 is a diagram illustrating exemplary syntax of userdataConfig( ).

FIG. 14 is a diagram illustrating exemplary syntax of ATSC_user_data( ).

FIG. 15 is a diagram illustrating exemplary extensions of user_data_type_code.

FIG. 16 is a diagram illustrating exemplary syntax of WM_Service_information( ).

FIG. 17 is a diagram illustrating exemplary syntax of video_sequence( ) compliant with MPEG-2.

FIG. 19 is a diagram illustrating exemplary syntax of user_data( ).

FIG. 21 is a diagram illustrating exemplary syntax of WM_Service_infcrmation( ).

FIG. 22 is a diagram illustrating exemplary syntax of user_data_registered_itu_t_t35( ).

FIG. 24 is a diagram illustrating exemplary syntax of WM_Service_infcrmation( ).

FIG. 25 is a diagram illustrating exemplary syntax of User Service Bundle Description (ROUTE).

FIG. 26 is a diagram illustrating exemplary syntax of Service Transport Session Instance Description.

FIG. 27 is a diagram illustrating exemplary syntax of User Service Bundle Description (MMT).

FIG. 28 is a diagram illustrating exemplary syntax of TS program map section( ).

FIG. 29 is a diagram illustrating exemplary syntax of WM_component_descriptor( ).

FIG. 30 is a diagram illustrating exemplary values of watermark_service_type.

FIG. 31 is a flowchart illustrating a transmission and reception process.

FIG. 32 is a block diagram illustrating an exemplary configuration of a computer.

DESCRIPTION OF EMBODIMENTS

Embodiments of the present technology will now be described with reference to the drawings. The description will be given in the order indicated below.
1. System Configuration
2. Embodiments of Present Technology
(1) First Embodiment: Audio Layer Transmission Methods
(2) Second Embodiment: Video Layer Transmission Methods
(3) Third Embodiment: System Layer Transmission Methods
3. Processing Steps at Transmitting and Receiving Ends
4. Exemplary Modifications
5. Computer Configuration

1. System Configuration (Exemplary Configuration of Transmission System)

Figure 1:
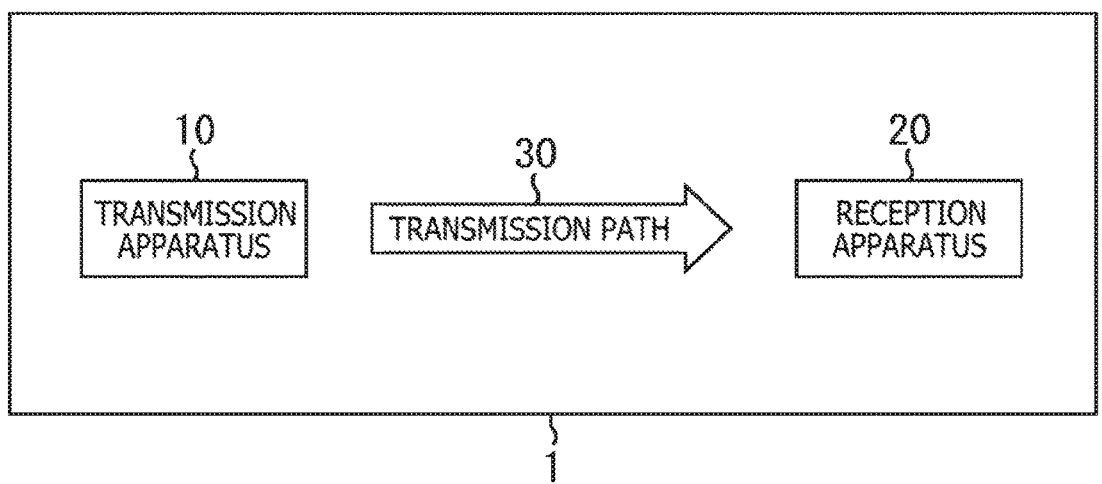
FIG. 1 is a block diagram illustrating an exemplary configuration of a transmission system according to an embodiment of the present technology.

FIG. 1 is a block diagram illustrating a configuration of a transmission system according to an embodiment of the present technology.

Referring to FIG. 1, a transmission system 1 includes a transmission apparatus 10 and a reception apparatus 20.

The transmission apparatus 10 transmits signals, for example, for delivering broadcast services (digital broadcast and data transmission). More specifically, the transmission apparatus 10 transmits, for example, a stream through a transmission path 30 as a broadcast signal (broadcast wave). In this instance, the stream includes transmission target data such as video and audio data handled as components of a television program or other broadcast service.

The reception apparatus 20 receives a broadcast signal that is transmitted from the transmission apparatus 10 through the transmission path 30, restores the received broadcast signal to an original stream, and outputs the original stream. For example, the reception apparatus 20 outputs video and audio data that are components of a television program or other broadcast service.

It should be noted that the transmission system 1 depicted in FIG. 1 is applicable to data transmissions compliant, for example, with the DVB (Digital Video Broadcasting) standards or the ISDB (Integrated Services Digital Broadcasting) standard and other data transmissions in addition to data transmissions compliant with the ATSC (Advanced Television Systems Committee standards). Further, for example, in addition to a terrestrial wave, a satellite line or a cable television network (wired line) may be used as the transmission path (Configuration of Transmission Apparatus)

Figure 2:
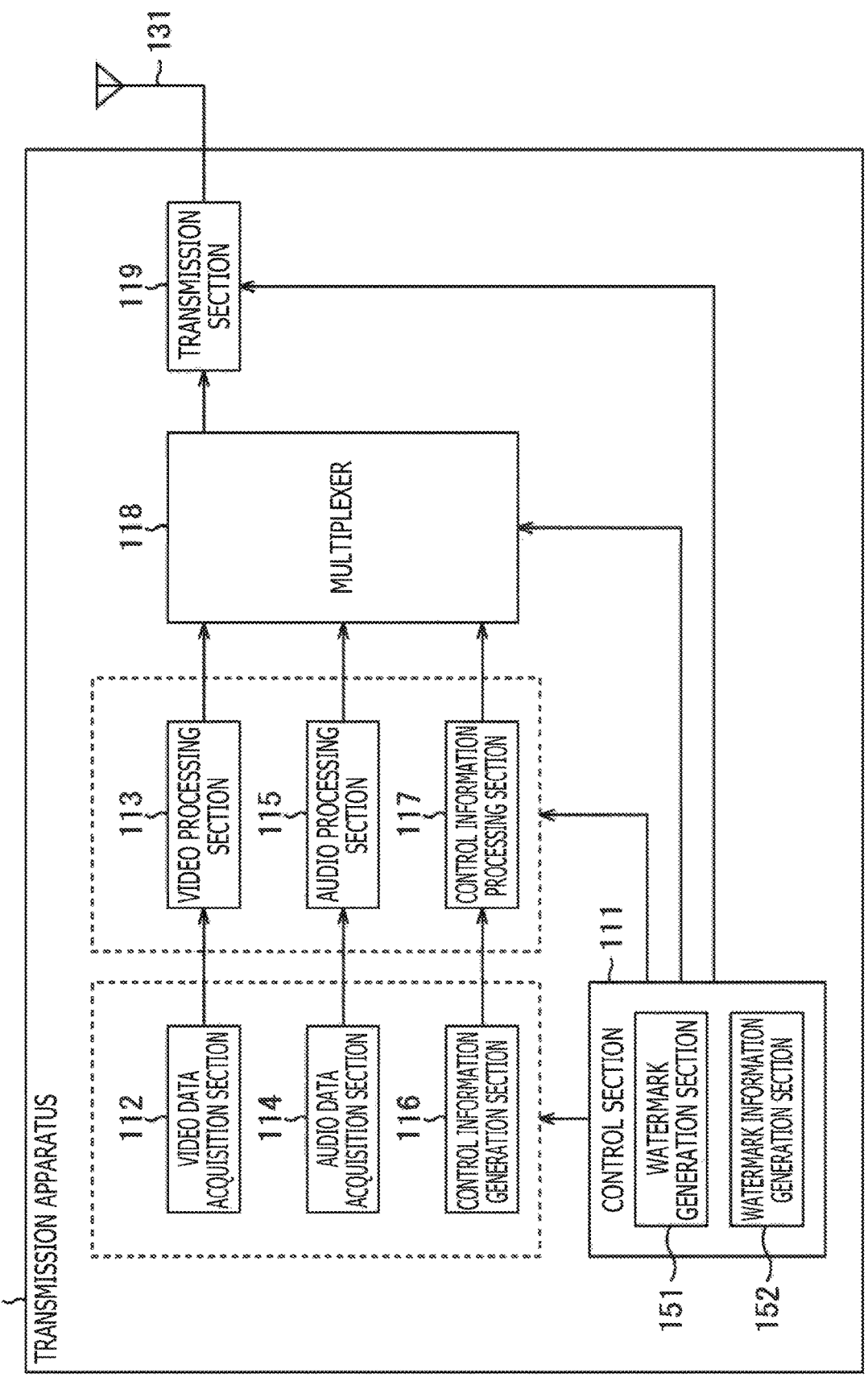
FIG. 2 is a block diagram illustrating an exemplary configuration of a transmission apparatus.

FIG. 2 is a block diagram illustrating an exemplary configuration of the transmission apparatus 10 depicted in FIG. 1.

Referring to FIG. 2, the transmission apparatus 10 includes a control section 111, a video data acquisition section 112, a video processing section 113, an audio data acquisition section 114, an audio processing section 115, a control information generation section 116, a control information processing section 117, a multiplexer 118, and a transmission section 119.

The control section 111 includes, for example, a CPU (Central Processing Unit) or the like. The control section 111 operates as a central control device in the transmission apparatus 10. For example, the control section 111 performs various arithmetic processes and controls operations of various sections.

The video data acquisition section 112 includes, for example, an interface circuit such as a communication I/F (interface). The video data acquisition section 112 acquires video data regarding a television program or other content, for example, from an external server, a camera, or a recording medium, and supplies the acquired video data to the video processing section 113.

The video processing section 113 includes, for example, a video encoder. The video processing section 113 subjects the video data supplied from the video data acquisition section 112 to an encoding or other process compliant with a predetermined encoding method, and supplies the processed video data to the multiplexer 118 as a video stream.

The audio data acquisition section 114 includes, for example, an interface circuit such as a communication I/F. The audio data acquisition section 114 acquires audio data regarding a television program or other content, for example, from an external server, a microphone, or a recording medium, and supplies the acquired audio data to the audio processing section 115.

The audio processing section 115 includes, for example, an audio encoder. The audio processing section 115 subjects the audio data supplied from the audio data acquisition section 114 to an encoding or other process compliant with a predetermined encoding method, and supplies the processed audio data to the multiplexer 118 as an audio stream, for example.

The control information generation section 116 generates control information that is to be used for content channel selection, reproduction, or other processing at a receiving end, and supplies the generated control information to the control information processing section 117.

The control information processing section 117 processes the control information supplied from the control information generation section 116, and supplies the processed control information to the multiplexer 118. It should be noted that the control information generation section 116 and the control information processing section 117 each include, for example, a dedicated control information processing circuit or the like.

The multiplexer 118 multiplexes the video stream, which is supplied from the video processing section 113, the audio stream, which is supplied from the audio processing section 115, and control information (system information), which is supplied from the control information processing section 117, and supplies the resulting multiplexed stream to the transmission section 119.

The transmission section 119 includes, for example, a modulation circuit that performs modulation of an OFDM (Orthogonal Frequency Division Multiplexing) signal, or the like. The transmission section 119 receives a multiplexed stream supplied from the multiplexer 118, and transmits the multiplexed stream as a broadcast signal through an antenna 131.

Although a detailed explanation is omitted here, the transmission section 119 and the antenna 131, which is for transmission, are installed, for example, in a facility of a transmitting station, and the antenna 131 is used to transmit the broadcast signal.

Further, the control section 111 includes a watermark generation section 151 and a watermark information generation section 152.

The watermark generation section 151 performs a process of generating a watermark such as a video watermark or an audio watermark.

For example, the watermark generation section 151 controls the video processing section 113 so as to perform a process of inserting a video watermark into a video stream. Further, for example, the watermark generation section 151 controls the audio processing section 115 so as to perform a process of inserting an audio watermark into an audio stream.

The watermark information generation section 152 performs a process of generating information for detecting a watermark (hereinafter referred to as the watermark information).

For example, the watermark information generation section 152 controls the video processing section 113, the audio processing section 115, or the control information processing section 117 so as to perform a process of including the watermark information in any one of an audio stream layer (audio layer), a video stream layer (video layer), or a system information layer (system layer). Methods of transmitting this watermark information will be described in detail later.

It should be noted that two or more upper lines (e.g., two lines) of a video display region of one video frame can be used as a watermark in order to transmit data representative of information the amount of which is based on bits allocated to the associated region (refer, for example, to NPLs 2 and 3 below). Further, the audio watermark is described in detail in NPLs 1 and 3 below.

[NPL 1]
ATSC Standard, Audio Watermark Emission (A/334)
[NPL 2]
ATSC Standard, Video Watermark Emission (A/335)
[NPL 3]
ATSC Standard, Content Recovery in Redistribution Scenarios (A/336)

(Configuration of Reception Apparatus)

FIG. 3 is a block diagram illustrating an exemplary configuration of the reception apparatus 20 depicted in FIG. 1.

Referring to FIG. 3, the reception apparatus 20 includes a control section 211, a recording section 212, an input section 213, a reception section 214, a demultiplexer 215, a video processing section 216, a video output section 217, an audio processing section 218, an audio output section 219, a display section 220, and a speaker 221.

The control section 211 includes, for example, a CPU, an FPGA (Field Programmable Gate Array) or the like. The control section 211 operates as a central control device in the reception apparatus 20. For example, the control section 211 performs various arithmetic processes and controls various operations.

The recording section 212 includes, for example, a non-volatile memory such as an NVRAM (Non Volatile RAM), and records various data according to control by the control section 211.

The input section 213 includes, for example, physical buttons or a touch panel integral with the display section 220, and supplies an operating signal based on a user operation to the control section 211. The control section 211 controls operations of various sections on the basis of the operating signal inputted from the input section 213. It should be noted that the input section 213 may receive, for example, an infrared signal based on a user operation performed on a remote controller, and supply a corresponding operating signal to the control section 211.

The reception section 214 includes, for example, a tuner and a demodulation circuit that performs demodulation of a signal such as an OFDM signal, or the like. The reception section 214 processes a broadcast signal received through an antenna 231, and supplies a resulting multiplexed stream to the demultiplexer 215.

The demultiplexer 215 separates the multiplexed stream, which is supplied from the reception section 214, into a video stream, an audio stream, and control information (system information). The demultiplexer 215 supplies video data included in the video stream to the video processing section 216, supplies audio data included in the audio stream to the audio processing section 218, and supplies the control information to the control section 211.

On the basis of the control information (system information) supplied from the demultiplexer 215, the control section 211 controls operations of various sections such as processing sections of the demultiplexer 215 and various other components in order to reproduce a television program or other content based on a broadcast service channel selection operation.

The video processing section 216 includes, for example, a video decoder or the like. The video processing section 216 receives video data supplied from the demultiplexer 215, subjects the received video data to a decoding or other process compliant with a predetermined decoding method, for example, and supplies the resulting processed video data to the video output section 217.

The video output section 217 includes, for example, a video output circuit for outputting video or the like. The video output section 217 processes the video data supplied from the video processing section 216, and supplies the processed video data to the display section 220, which is configured as such a display as an LCD (Liquid Crystal Display) or an OLED (Organic Light Emitting Diode) display. This causes the display section 220 to display video of a television program or other content based on a broadcast service channel selection operation.

The audio processing section 218 includes, for example, an audio decoder or the like. The audio processing section 218 receives audio data supplied from the demultiplexer 215, subjects the received audio data to a decoding or other process compliant with a predetermined decoding method, for example, and supplies the resulting processed audio data to the audio output section 219.

The audio output section 219 includes, for example, an audio output circuit for outputting audio or the like. The audio output section 219 processes the audio data supplied from the audio processing section 218, and supplies the processed audio data to the speaker 221. This causes the speaker 221 to output audio of a television program or other content based on a broadcast service channel selection operation.

Further, the control section 211 includes a watermark information acquisition section 251 and a watermark detection section 252.

The watermark information acquisition section 251 performs a process of acquiring watermark information.

For example, the watermark information acquisition section 251 controls the video processing section 216, the audio processing section 218, or other section so as to acquire the watermark information included in any one of the audio layer, the video layer, or the system layer. Methods of transmitting the watermark information will be described in detail later.

On the basis of the watermark information, the watermark detection section 252 performs a process of detecting a watermark such as a video watermark or an audio watermark.

For example, on the basis of the watermark information, the watermark detection section 252 controls the video processing section 113 so as to perform a process of detecting a video watermark included in a video stream. Further, for example, the watermark detection section 252 controls the audio processing section 218 so as to perform a process of detecting an audio watermark included in an audio stream.

It should be noted that the reception apparatus 20 may be configured, for example, as a fixed receiver such as a television receiver, a set-top box (STB: Set Top Box), a recorder, a personal computer, or a game device, or as a mobile receiver such as a smartphone, a mobile phone, or a tablet computer.

Accordingly, the configuration illustrated in FIG. 3 includes the display section 220 and the speaker 221. However, in a case where the reception apparatus 20 is configured, for example, as a set-top box, a recorder, or a game device, the configuration of the reception apparatus 20 does not need to include the display section 220 and the speaker 221.

It should be noted that, for the sake of explanation, only one transmission apparatus 10 and one reception apparatus 20 are depicted in FIG. 1, which depicts the transmission system 1. However, a plurality of transmission apparatuses 10 may be installed as needed to provide one transmission apparatus 10 for each agent such as a broadcasting station, for example. Further, for example, the reception apparatus 20 may be configured as a television receiver and installed at each user's home.

2. Embodiments of Present Technology

As the methods of transmitting the watermark information, the present technology proposes six transmission methods depicted in FIG. 4.

Firstly, the present technology proposes two transmission methods that use 3D audio data in order to add watermark information to audio data included in an audio stream by using the audio layer. One transmission method uses 3D audio metadata (hereinafter also referred to as the first audio layer transmission method). The other transmission method uses 3D audio user data (hereinafter also referred to as the second audio layer transmission method).

Here, it should be noted that 3D audio creates unprecedentedly realistic sensations by using many speakers including a speaker placed overhead in order to achieve sound reproduction in every spatial direction. MPEG (Moving Picture Experts Group) is establishing MPEG-H 3D Audio standard.

The first audio layer transmission method inserts watermark information into a metadata region of audio data compliant, for example, with the MPEG-H 3D Audio standard. Meanwhile, the second audio layer transmission method inserts watermark information into a user data region of audio data compliant, for example, with the MPEG-H 3D Audio standard.

Secondly, the present technology proposes two transmission methods that use video user data in order to add watermark information to video data included in a video stream by using the video layer. These two transmission methods are hereinafter referred to as the first video layer transmission method and the second video layer transmission method, respectively, for distinguishing purposes.

Here, it should be noted that well-known video compression standards are, for example, MPEG-2, MPEG4-AVC (Advanced Video Coding), and HEVC (High Efficiency Video Coding).

MPEG-2 is widespread and used, for example, for digital broadcasting and DVD-Video. MPEG4-AVC achieves compression efficiency two or more times higher than MPEG-2, and presumably allows widespread use ranging from low bit rate applications to high bit rate applications. HEVC excels in compression efficiency, for example, for block size optimization, achieves compression performance approximately four times higher than MPEG-2 and approximately two times higher than MPEG4-AVC, and is presumably applicable to high-resolution video (e.g., 4K video and 8K video) and video distribution to mobile terminals.

The first video layer transmission method, for example, inserts the watermark information into a user data region of video data compliant with MPEG-2. Meanwhile, the second video layer transmission method inserts the watermark information into a user region of video data compliant with MPEG4-AVC or HEVC.

Thirdly, the present technology proposes two transmission methods that use the control information (system information) in order to transmit the control information including watermark information by using the system layer. These two transmission methods are hereinafter referred to as the first system layer transmission method and the second system layer transmission method, respectively, for distinguishing purposes.

Here, it should be noted that ATSC (Advanced Television Systems Committee) 3.0 is formulated as a next-generation terrestrial broadcast standard. ATSC 3.0 adopts an IP transmission method for transmitting data by using an IP (Internet Protocol) packet including a UDP (User Datagram Protocol) packet, and presumably provides more advanced services. It should also be noted that MPEG2-TS (Transport Stream) transmits data by using a fixed-length TS packet, is adopted for digital broadcasting in various countries, and is widely used as a video/audio multiplexing method.

The first system layer transmission method inserts the watermark information, for example, into a signaling that is control information compliant with ATSC 3.0. Meanwhile, the second system layer transmission method inserts the watermark information, for example, into a PMT (Program Map Table) of PSI (Program Specific Information) that is control information compliant with MPEG2-TS.

The above-mentioned six watermark information transmission methods will now sequentially be described in detail.

(1) First Embodiment

A first embodiment will now be described in conjunction with the methods of transmitting the watermark information by using the audio layer.

(1-1) First Audio Layer Transmission Method

First of all, the first audio layer transmission method will be described with reference to FIGS. 5 to 9. The first audio layer transmission method inserts the watermark information into the metadata region of audio data compliant with MPEG-H 3D Audio.

It is well to remember that MPEG-H 3D Audio is described in detail, for example, in NPL 4 below.

[NPL 4]

ISO/IEC 23008-3, "High efficiency coding and media delivery in heterogeneous environments—Part 3: 3D Audio"

Figure 5:
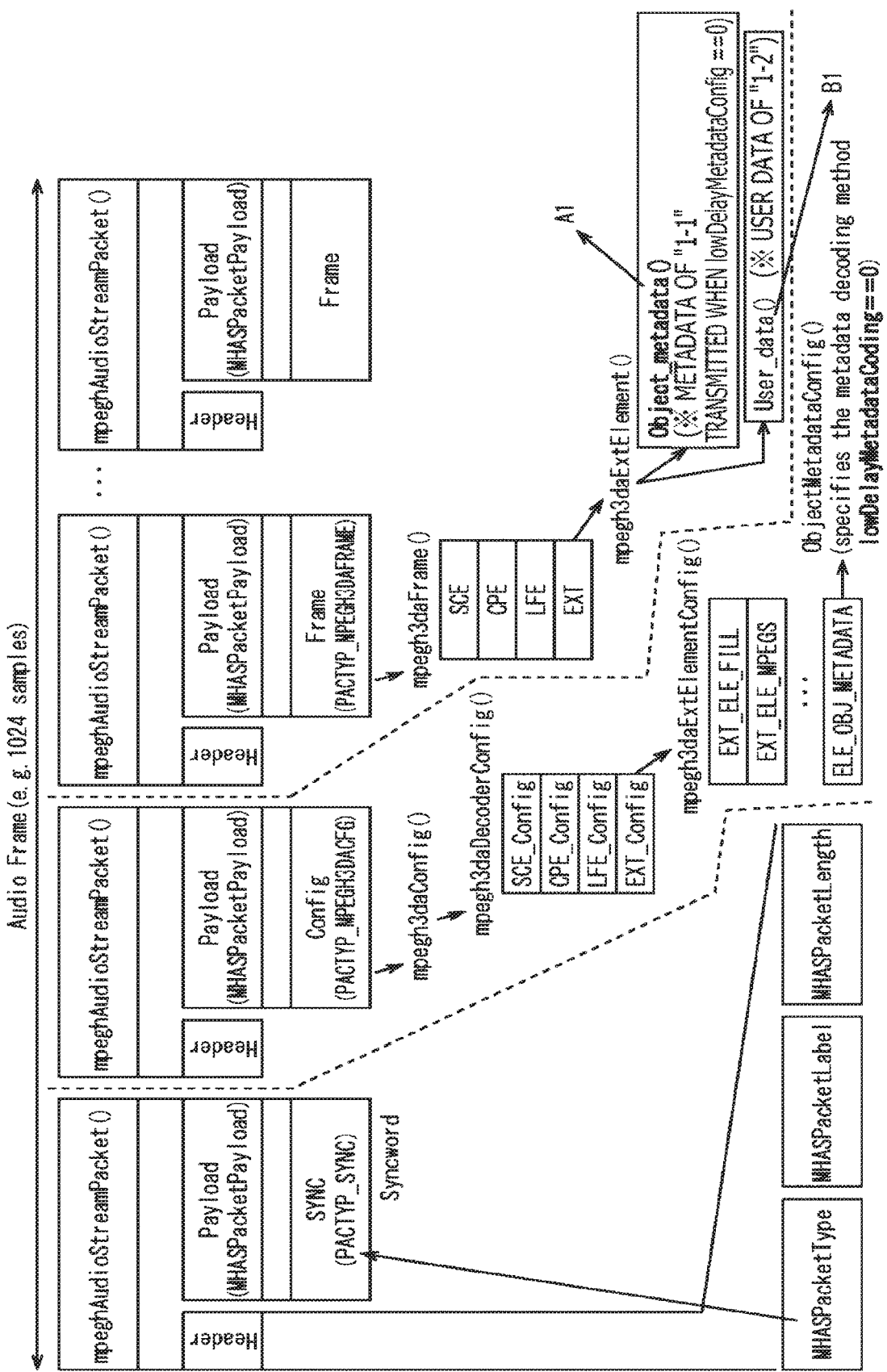
FIG. 5 is a diagram illustrating a structure of an audio frame compliant with MPEG-H 3D Audio.

FIG. 5 is a diagram illustrating a structure of an audio frame compliant with MPEG-H 3D Audio.

Referring to FIG. 5, the audio frame includes a plurality of MPEG audio stream packets (mpeghAudioStreamPacket( )). The MPEG audio stream packets each includes a header and a payload (MHASPacketPayload).

Various kinds of information, such as packet type (MHASPacketType), packet label (MHASPacket Label), and packet length (MHASPacketLength), are disposed in the header. Meanwhile, information defined by the packet type of the header is disposed in the payload. "SYNC," "Frame," and "Config" exist in this payload. "SYNC" is equivalent to a synchronization start code. "Frame" represents actual data. "Config" indicates the configuration of "Frame."

Object data regarding an object sound source for 3D audio includes object audio data and object metadata. These data are included in "Frame." Acting as "Frame," mpegh3daFrame( ) includes SCE (Single Channel Element), CPE (Channel Pair Element), LFE (LFE element), and EXT (Extension element).

The object audio data is included as encoded sample data for SCE. Meanwhile, the object metadata is included as an extension element (EXT). Here, the extension element (EXT) including user data can be further defined.

The first audio layer transmission method inserts the watermark information into a region of object metadata included as this extension element (EXT) (metadata region). This metadata region corresponds to Object_metadata( ) of mpegh3daExtElement( ) in FIG. 5.

However, the region of object metadata (metadata region) is transmitted in a case where lowDelayMetadataCoding=="0" in ObjectMetadataConfig( ). It should be noted that ObjectMetadataConfig( ) is included in mpegh3daExtElementConfig( ) of mpegh3 daDecoderConfig( ) of mpegh3daConfig( ), which is disposed as "Config" in the payload of an MPEG audio stream packet.

Although details will be described later, it should be noted that a method of inserting the watermark information into a region of user data included as the extension element (EXT) (user data region) is equivalent to the later-described second audio layer transmission method.

Figure 6:
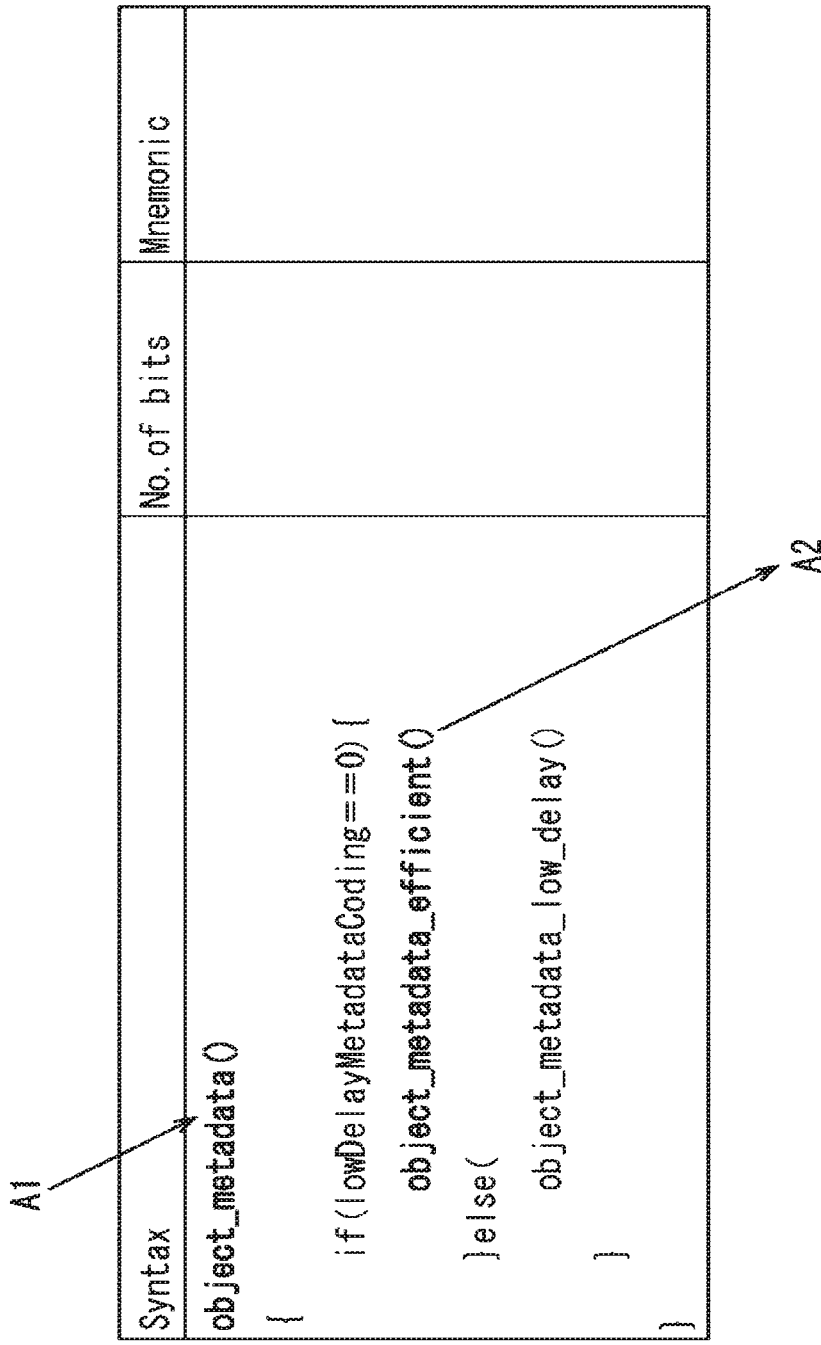
FIG. 6 is a diagram illustrating exemplary syntax of object_metadata( ).

FIG. 6 illustrates an exemplary syntax of object_metadata( ). As illustrated in FIG. 6, object_metadata_efficient( ) is disposed in object_metadata( ) when lowDelayMetadataCoding=="0" is established.

FIG. 7 illustrates an exemplary syntax of object_metadata_efficient( ). As illustrated in FIG. 7, intracoded_object_metadata_efficient( ) is disposed in object_metadata_efficient( ).

FIG. 8 illustrates an exemplary syntax of intracoded_object_metadata_efficient( ). While intracoded_object_metadata_efficient( ) depicted in FIG. 8 corresponds to intracoded_object_metadata_efficient( ) defined by MPEG-H 3D Audio, intracoded_object_metadata_efficient( ) depicted in FIG. 8 differs from intracoded_object_metadata_efficient( ) defined by MPEG-H 3D Audio in that WM_Service_information( ) is added to the last line as the watermark information.

FIG. 9 illustrates an exemplary syntax of WM_Service_information( ).

One bit watermark_service_flag is a graph indicating whether a watermark service is valid.

For example, when "1" is set as watermark_service_flag, it indicates that the watermark service is valid, and that a video watermark included in a video stream or an audio watermark included in an audio stream exists. Meanwhile, when "0" is set as watermark_service_flag, it indicates that the watermark service is invalid.

Seven-bit reserved is a reserved region for future use. It should be noted that 7-bit reserved is acquired to perform byte alignment. However such byte alignment is not necessarily required to be performed. This also holds true for the later-described other syntaxes that perform byte alignment.

It should be noted that WM_Service_information( ) is added to the last line of intracoded_object_metadata_efficient( ) depicted in FIG. 8, but WM_Service_information( ) may be added to any region.

As described above, when the first audio layer transmission method is used, the watermark information indicating whether the watermark service is valid is inserted into the metadata region of audio data compliant with MPEG-H 3D Audio, and then transmitted.

(1-2) Second Audio Layer Transmission Method

The second audio layer transmission method will now be described with reference to FIGS. 10 to 16. The second audio layer transmission method inserts the watermark information into the user data region of audio data compliant with MPEG-H 3D Audio.

Here, as depicted in FIG. 5, which illustrates the structure of an audio frame compliant with MPEG-H 3D Audio, user data is defined as the extension element (EXT), and the watermark information is inserted into the user data. This user data region corresponds to User_data( )(Ancillary data) of mpegh3daExtElement( ) in FIG. 5.

FIG. 10 illustrates exemplary extensions of usacExtElementType. Referring to FIG. 10, disposed as usacExtElementType is ID_EXT_ELE_USERDATA in addition to ID_EXT_ELE_FILL, ID_EXT_ELE_MPEGS, ID_EXT_ELE_SAOC, ID_EXT_ELE_AUDIOPREROLL, ID_EXT_ELE_UNI_DRC, ID_EXT_ELE_OBJ_METADATA, ID_EXT_ELE_SAOC_3D, and ID_EXT_ELE_HOA, ID_EXT_ELE_FMT_CNVRTR.

Associated with ID_EXT_ELE_USERDATA is user_data( ), which is a user data region. Meanwhile, FIG. 11 illustrates exemplary values of usacExtElementType.

In a case where, for example, "128" is set as the value of usacExtElementType as depicted in FIG. 11, it signifies ID_EXT_ELE_USERDATA so that user_data( ) is disposed in mpegh3daExtElement( ).

FIG. 12 illustrates an exemplary syntax of userdataConfig( ).

Thirty two-bit userdata_identifier is a field that represents user data when a predefined array value is set. Sixteen-bit userdata_frame_length is a field that indicates the number of bytes of the user data. According to the number of bytes indicated by userdata_frame_length, user_data( ) is disposed.

Figure 13:
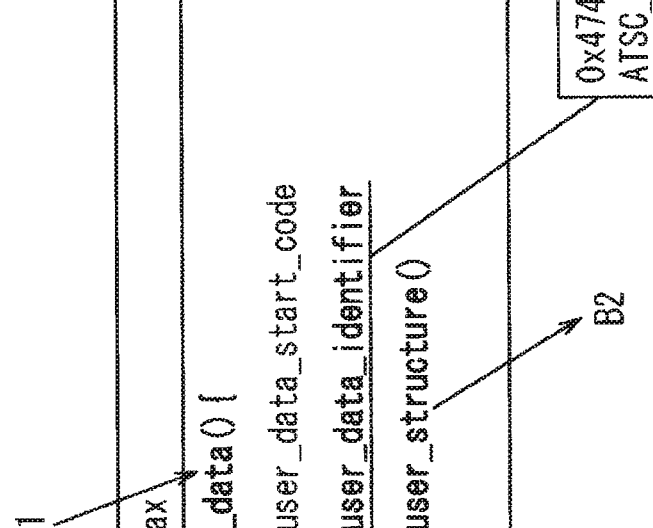
FIG. 13 is a diagram illustrating exemplary syntax of user_data( ).

FIG. 13 illustrates an exemplary syntax of user_data( ). Referring to FIG. 13, when "0x47413934" ("GA94") is set in user data identifier, which is a 32-bit field, ATSC_user_data( ) is disposed in the field of user_structure( ).

FIG. 14 illustrates an exemplary syntax of ATSC_user_data( ).

Eight-bit user_data_type_code is a field indicating the type of user data. Data is disposed in the field of user_data_type_structure( ) according to the type of user data set in user_data_type_code.

FIG. 15 illustrates exemplary extensions of user_data_type_code. When, for example, "0x07" is set in user_data_type_code, which is 8-bit field bits, WM_Service_information( ), which is watermark information, is disposed in the field of user_data_type_structure( ).

FIG. 16 illustrates an exemplary syntax of WM_Service_information( ).

One-bit watermark_service_flag is a flag indicating whether the watermark service is valid. It should be noted that byte alignment is performed by 7 bits following watermark_service_flag.

As described above, when the second audio layer transmission method is used, the watermark information indicating whether the watermark service is valid is inserted into the user data region of audio data compliant with MPEG-H 3D Audio, and then transmitted.

The first embodiment has been described above. In the first embodiment, the transmission apparatus 10 inserts the watermark information, for example, into the metadata region or user data region of audio data compliant with MPEG-H 3D Audio, and transmits the watermark information by using the audio layer. Then, on the basis of the watermark information transmitted by using the audio layer, the reception apparatus 20 is able to determine whether the watermark service is valid, and detect a watermark.

Consequently, the reception apparatus 20 is able to determine whether the watermark service is valid, and detect a watermark, merely on the basis of the watermark information included in audio data, without having to additionally incorporate special functions such as the function of detecting that a video watermark is included in video data (e.g., arithmetic circuit or software processing) and the function of detecting an audio watermark included in audio data (e.g., DSP or other arithmetic unit).

As described above, the reception apparatus 20 is able to detect a watermark more easily. Further, when a method of constantly performing a monitoring process to check for a watermark is employed, the amount of power consumed by the monitoring process increases. This may cause a problem particularly in a case where a battery-driven mobile receiver is used. However, the present technology is capable of determining, on the basis of the watermark information, whether the watermark service is valid. This eliminates the necessity of constantly monitoring for a watermark. Consequently, it is possible to shorten the period of time during which a battery is used for driving purposes, and thus reduce the power consumption.

Further, as the video watermark is transmitted as video data (video signal), it is desired that the signal of the video watermark be erased (e.g., by blackening the signal) after the video data is decoded. However, using the watermark information makes it possible to easily detect the video watermark and perform, for example, a process of erasing the signal of the video watermark without having to additionally incorporate a special function (e.g., arithmetic circuit or software processing).

The first embodiment has been described above on the assumption that the adopted transmission method using the audio layer inserts the watermark information into the metadata region or user data region of audio data compliant with MPEG-H 3D Audio. However, the audio data may alternatively be in a format compliant with a standard other than MPEG-H 3D Audio. Further, the watermark information may alternatively be inserted into an audio data region other than the metadata region or the user data region.

Moreover, in a case where "uimsbf (unsigned integer most significant bit first)" is designated in items of "Mnemonic" or "Format" of the aforementioned syntax, it signifies that a bit operation is performed to handle the result as an integer. Meanwhile, in a case where "bslbf (bit string, left bit first)" is designated as "Mnemonic" or "Format," it signifies that the result of the bit operation is handled as a bit string. The above-mentioned relationship also holds true for the later-described other syntaxes.

(2) Second Embodiment

A second embodiment will now be described in conjunction with the methods of transmitting the watermark information by using the video layer.

(2-1) First Video Layer Transmission Method

First of all, the first video layer transmission method will be described with reference to FIGS. 17 to 21. The first video layer transmission method inserts the watermark information into the user data region of video data compliant with MPEG-2.

It is well to remember that MPEG-2 Video is described in detail, for example, in NPLs 5 and 6 below.

[NPL 5]

ISO/IEC 13818-2, "Generic coding of moving pictures and associated audio information—Part 2: Video"

[NPL 6]

ATSC Digital Television Standard: Part 4—MPEG-2 Video System Characteristics

FIG. 17 illustrates an exemplary syntax of video_sequence( ) of video data compliant with MPEG-2. As depicted in FIG. 17, the field of extension_and_user_data(2) is disposed in video_sequence( ).

Figure 18:
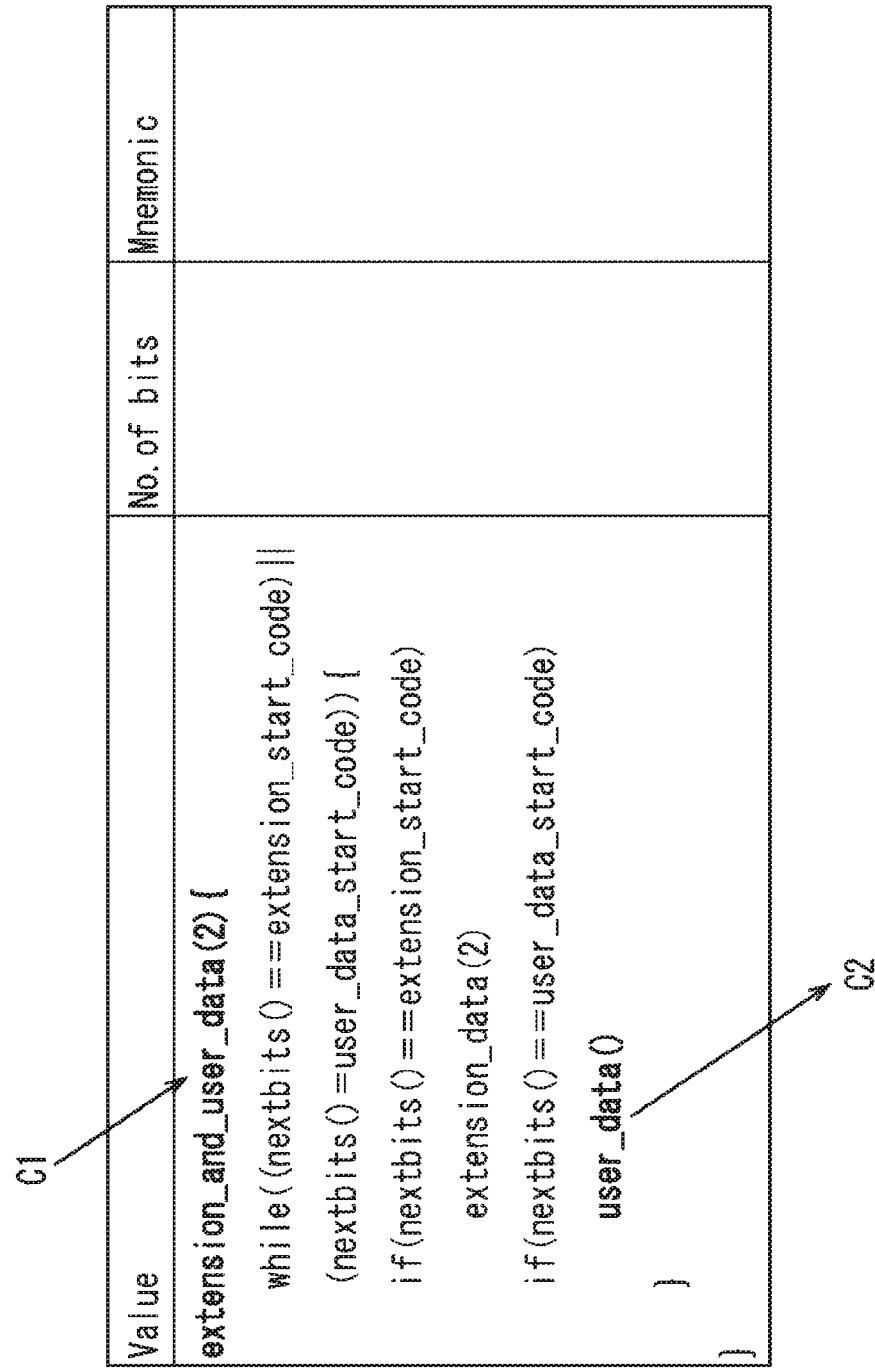
FIG. 18 is a diagram illustrating exemplary syntax of extension_and_user_data(2).

FIG. 18 illustrates an exemplary syntax of extension_and_user_data(2). As depicted in FIG. 18, the field of user_data( ) is disposed in extension_and_user_data(2).

FIG. 19 illustrates an exemplary syntax of user_data( ). Referring to FIG. 19, when "0x47413934" ("GA94") is set in the 32-bit field of user_data_identifier, ATSC_user_data( ) is disposed in the field of user structure( ).

Figure 20:
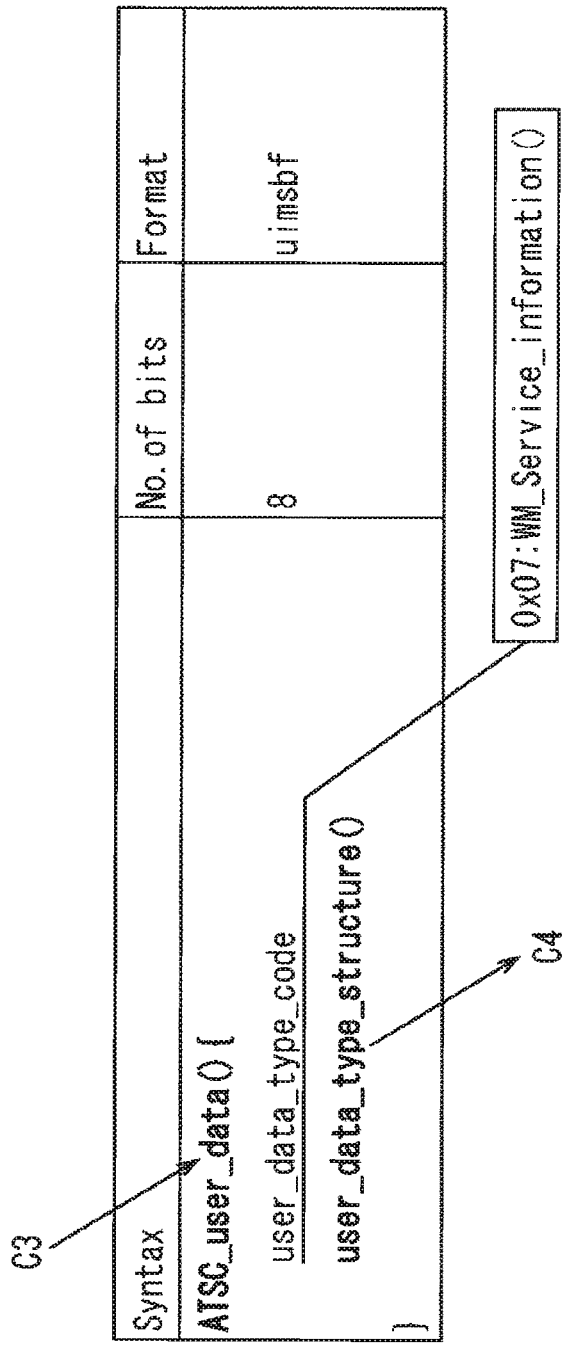
FIG. 20 is a diagram illustrating exemplary syntax of ATSC_user_data( ).

FIG. 20 illustrates an exemplary syntax of ATSC_user_data( ). Referring to FIG. 20, when, for example, "0x07" is set in the 8-bit field of user_data_type_code, WM_Service_information( ) as the watermark information is disposed in the field of user_data_type_structure( ).

Here, as depicted in FIG. 15 mentioned above, it is assumed that user_data_type_code, which is "0x07," is assigned to user_data_type_structure( ), which is WM_Service_information( ).

FIG. 21 illustrates an exemplary syntax of WM_Service_information( ).

One-bit watermark_service_flag is a flag indicating whether the watermark service is valid. It should be noted that byte alignment is performed by 7 bits following watermark_service_flag.

As described above, when the first video layer transmission method is used, the watermark information indicating whether the watermark service is valid is inserted into the user data region of video data compliant with MPEG-2, and then transmitted.

(2-2) Second Video Layer Transmission Method

Next, the second video layer transmission method will be described with reference to FIGS. 22 to 24. The second video layer transmission method inserts the watermark information into the user region of video data compliant with MPEG4-AVC or HEVC.

It should be noted that an example described here relates to the use of MPEG4-AVC or SEI (Supplemental Enhancement Information) of HEVC. SEI is described in detail, for example, in NPL 7 below.

[NPL 7]

ANSI/SCTE 128-1 "AVC Video Constraints for Cable Television Part 1—Coding"

FIG. 22 illustrates an exemplary syntax of user_data_registered_itu_t_t35( ), which is SEI user data. Referring to FIG. 22, when "0x47413934" ("GA94") is set in the 32-bit field of user identifier, ATSC1_data( ) is disposed in the field of user_structure( ).

Figure 23:
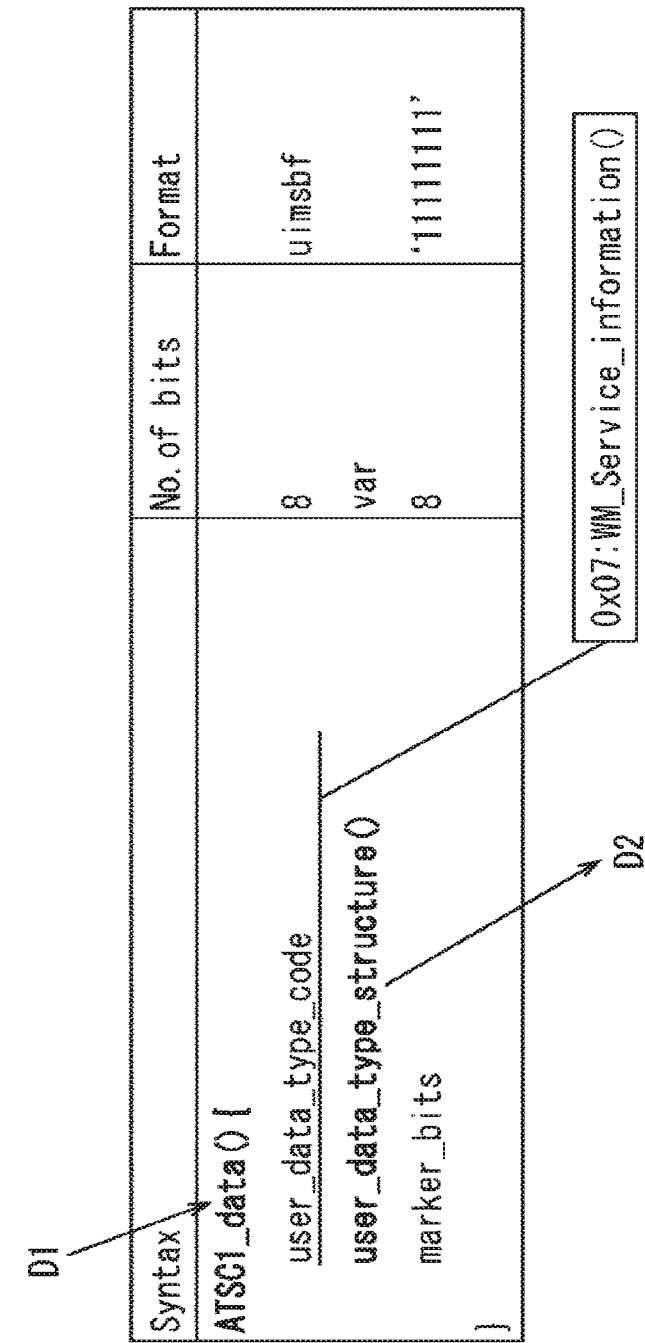
FIG. 23 is a diagram illustrating exemplary syntax of ATSC1_data( ).

FIG. 23 illustrates an exemplary syntax of ATSC1_data( ). Referring to FIG. 23, when, for example, "0x07" is set in the 8-bit field of user_data_type_code, WM_Service_information( ) as the watermark information is disposed in the field of user_data_type_structure( ).

FIG. 24 illustrates an exemplary syntax of WM_Service_information( ).

One-bit watermark_service_flag is a flag indicating whether the watermark service is valid. It should be noted that byte alignment is performed by 7 bits following watermark_service_flag.

As described above, when the second video layer transmission method is used, the watermark information indicating whether the watermark service is valid is inserted into the user data region of video data compliant with MPEG4-AVC or HEVC, and then transmitted.

The second embodiment has been described above. In the second embodiment, the transmission apparatus 10 inserts the watermark information, for example, into the user data region of video data compliant with MPEG-2, MPEG4-AVC, or HEVC, and transmits the watermark information by using the video layer. Then, on the basis of the watermark information transmitted by using the video layer, the reception apparatus 20 is able to determine whether the watermark service is valid, and detect a watermark.

Consequently, the reception apparatus 20 is able to determine whether the watermark service is valid, and detect a watermark, merely on basis of the watermark information included in video data, without having to additionally incorporate special functions (e.g., arithmetic circuit or arithmetic unit) for detecting a watermark. As a result, the reception apparatus 20 is able to achieve watermark detection more easily.

The second embodiment has been described above on the assumption that the adopted transmission method using the video layer inserts the watermark information into the user data region of video data compliant with MPEG-2, MPEG4-AVC, or HEVC. However, the video data may alternatively be in a format compliant with a standard other than MPEG-2, MPEG4-AVC, or HEVC. Further, the watermark information may alternatively be inserted into a video data region other than the user data region.

(3) Third Embodiment

A third embodiment will now be described in conjunction with the methods of transmitting the watermark information by using the system layer.

(3-1) First System Layer Transmission Method

First of all, the first system layer transmission method will be described with reference to FIGS. 25 to 27. The first system layer transmission method inserts the watermark information into a signaling that is control information compliant with ATSC 3.0.

Here, it should be noted that ATSC 3.0 defines LLS (Low Level Signaling) and SLS (Service Layer Signaling) as the forms of signaling (refer to NPL 8 below).

[NPL 8]

ATSC Proposed Standard: Signaling, Delivery, Synchronization, and Error Protection (A/331)

LLS includes metadata such as an SLT (Service List Table). SLT includes information necessary for broadcast service channel selection and other basic information indicating a configuration of streams and broadcast services in a broadcast network.

SLS is service-level control information that provides, for example, information and attributes necessary for searching for and selecting a component belonging to a target broadcast service. SLS includes metadata such as USBD (User Service Bundle Description), S-TSID (Service-based Transport Session Instance Description), and MPD (Media Presentation Description).

USBD includes information regarding, for example, an acquirer of other metadata. S-TSID is obtained by extending LSID (LCT Session Instance Description) in compliance with ATSC 3.0, and is control information for the ROUTE (Real-time Object Delivery over Unidirectional Transport) protocol. MPD is control information for video and audio files that is used for streaming distribution compliant with MPEG-DASH (Dynamic Adaptive Streaming over HTTP).

The first system layer transmission method inserts the watermark information as a signaling compliant with ATSC 3.0 into USBD or S-TSID.

As indicated in "FIG. 5.1 ATSC 3.0 receiver protocol stack" of the above-mentioned NPL 8, it should be noted that the ROUTE protocol and MMT (MPEG Media Transport) protocol are defined as transport protocols by ATSC 3.0. USBD is used by both the ROUTE protocol and the MMT protocol. Therefore, the following description deals with MMT protocol USBD (USBD-MMT) in addition to ROUTE protocol USBD (USBD-ROUTE).

First Example: USBD-ROUTE

FIG. 25 illustrates an exemplary syntax of User Service Bundle Description (ROUTE).

It should be noted that FIG. 25 lists elements and attributes, and that "@" is attached to each attribute. Further, an indented element or attribute is designated with respect to its higher-level element. The above-mentioned relationship also holds true for later-referenced FIGS. 26 and 27.

The BundleDescriptionROUTE element is a root element and is a higher-level element for a UserServiceDescription element.

The UserServiceDescription element is a higher-level element for a globalServiceID attribute, a serviceId attribute, a serviceStatus attribute, a Name element, a ServiceLanguage element, a DeliveryMethod element, a BroadcastAppService element, a UnicastAppService element, a VideoWaterMarkService element, and an AudioWaterMarkService element.

A global service ID is designated as the globalServiceID attribute. A service ID is designated as the serviceId attribute. Information regarding the status of a service is designated as the serviceStatus attribute.

A name of an ATSC 3.0 service is designated as the Name element. The Name element is a higher-level element for a lang attribute. A language of an ATSC 3.0 service name is designated as the lang attribute. A language available for an ATSC 3.0 service is designated as the ServiceLanguage element.

Information regarding a data distribution method is designated as the DeliveryMethod element. The BroadcastAppService element is a higher-level element for a BasePattern element, and information regarding distribution by broadcasting is designated as the BroadcastAppService element. The UnicastAppService element is a higher-level element for the BasePattern element, and information regarding distribution by communication is designated as the UnicastAppService element.

The VideoWaterMarkService element indicates that a video watermark (video watermark service) is included in video data. The AudioWaterMarkService element indicates that an audio watermark (audio watermark service) is included in audio data.

It is well to remember that USBD for the ROUTE protocol is described in detail under "Table 7.1 Semantics of the User Service Bundle Description Fragment for ROUTE" in the above-mentioned NPL 8.

Second Example: S-TSID

FIG. 26 illustrates an exemplary syntax of Service Transport Session Instance Description.

The S-TSID element is a root element and is a higher-level element for the RS element, which indicates information regarding one or a plurality of ROUTE sessions. The RS element is a higher-level element for a sIpAddr attribute, a dIpAddr attribute, a dport attribute, and an LS element.

A ROUTE session source IP address (source IP address) is designated as the sIpAddr attribute. A ROUTE session destination IP address (destination IP address) is designated as the dIpAddr attribute. A ROUTE session port number is designated as the dport attribute.

Information regarding an LCT channel is written as the LS element. It should be noted that one or a plurality of LS elements may be disposed for each LCT channel. The LS element is a higher-level element for a tsi attribute, a bw attribute, a startTime attribute, a endTime attribute, a VideoWaterMarkService attribute, an AudioWaterMarkService attribute, an SrcFlow element, and a RepairFlow element.

A value of TSI (Transport Session Identifier) is designated as the tsi attribute. A maximum bandwidth is designated as the bw attribute. A start time and an end time are respectively designated as the startTime attribute and the endTime attribute.

The VideoWaterMarkService attribute indicates that a video watermark (video watermark service) is included in video data. The AudioWaterMarkService attribute indicates that an audio watermark (audio watermark service) is included in audio data.

Information regarding Source Flow is designated as the SrcFlow element. Information regarding Repair Flow is designated as the RepairFlow element.

It is well to remember that S-TSID is described in detail under "Table 7.2 Semantics of the Service-based Transport Session Instance Description Fragment" in the above-mentioned NPL 8.

Third Example: USBD-MMT

FIG. 27 illustrates an exemplary syntax of User Service Bundle Description (MMT).

The BundleDescriptionMMT element is a root element and is a higher-level element for the UserServiceDescription element.

The UserServiceDescription element is a higher-level element, for example, for the serviceId attribute, the serviceStatus attribute, and a ComponentInfo element.

A service ID is designated as the serviceId attribute. Information regarding the status of a service is designated as the serviceStatus attribute.

The ComponentInfo element indicates information regarding a component. The ComponentInfo element is a higher-level element for a componentType attribute, a componentRole attribute, a componentProtectedFlag attribute, a componentId attribute, a componentName attribute, the VideoWaterMarkService attribute, and the AudioWaterMarkService attribute.

The VideoWaterMarkService attribute indicates that a video watermark (video watermark service) is included in video data. The AudioWaterMarkService attribute indicates that an audio watermark (audio watermark service) is included in audio data.

It is well to remember that USBD for the MMT protocol is described in detail under "Table 7.4 XML Format of the User Service Bundle Description Fragment for MMTP" in the above-mentioned NPL 8.

Further, referring to FIGS. 25 to 27, in a case where "0 . . . 1" is designated as an item of "Use," it is possible to determine as appropriate whether to designate the associated element or attribute. Meanwhile, in a case where "1 . . . N" is designated as an item of "Use," one or more associated elements or attributes are designated. In a case were "1" is designated, only one associated element or attribute is always designated.

Furthermore, in a case where "unsignedShort" or "unsignedInt" is designated as an item of "Data Type," it indicates that a value of the associated element or attribute is of an integer type. In a case where "string" is designated, it indicates that the value of the associated element or attribute is of a character string type. Meanwhile, in a case where "boolean" is designated as an item of "Data Type," it indicates that the associated element or attribute is of a Boolean type. In a case where "dateTime" is designated, it indicates that the associated element or attribute represents a specific date and time.

It should be noted that the formats of metadata depicted in FIGS. 25 to 27 are merely examples, and alternatively, for example, a text format other than the XML (Extensible Markup Language) format may be adopted. Further, the metadata is not limited to be in text format but may also be in binary format.

As described above, when the first system layer transmission method is used, the watermark information indicating whether the watermark service is valid is inserted into a signaling (e.g., USBD, S-TSID, or other metadata) compliant with ATSC 3.0, and then transmitted.

(3-2) Second System Layer Transmission Method

Next, the second system layer transmission method will be described with reference to FIGS. 28 to 30. The second system layer transmission method inserts the watermark information into PMT of PSI, which is control information compliant with MPEG2-TS.

Here, MPEG2-TS is such that PSI (Program Specific Information) is included as control information (transmission control signal). PSI includes four different tables, namely, a PAT (Program Association Table), a CAT (Conditional Access Table), a PMT (Program Map Table), and an NIT (Network Information Table), and supplies information for implementing a function of allowing the reception apparatus 20 to demultiplex and decode a multiplexed stream.

The PAT includes information representing a list of programs included in a transport stream. The CAT includes information regarding a conditional access (CA) method used for multiplexing. The PMT stores, for example, the PID of each video or audio stream included in a program. The NIT includes information regarding a physical network.

The second system layer transmission method inserts the watermark information into the PMT of PSI as the control information compliant with MPEG2-TS. It is well to remember that PSI is described in detail, for example, in NPL 9 below.

[NPL 9]

ISO/IEC 13818-1, "Generic coding of moving pictures and associated audio information—Part 1: Systems"

FIG. 28 illustrates an exemplary syntax of TS_program_map_section( ) as a PMT data structure compliant with MPEG2-TS.

As illustrated in FIG. 28, a program loop (Program loop) and an ES loop (Elementary Stream loop) exist in TS_program_map_section( ). The program loop is used to dispose information regarding the whole program. The ES loop is used to dispose information regarding elementary streams of, for example, video and audio.

For example, a video elementary stream loop (Video ES Loop) and an audio elementary stream loop (Audio ES Loop) exist in the ES loop. The video elementary stream loop is associated with a video audio stream. The audio elementary stream loop is associated with an audio stream. Information regarding, for example, a stream type (Stream type) and an elementary identifier (elementary_PID) is disposed in each loop.

Here, WM_component_descriptor( ) is added to the ES loop. FIG. 29 illustrates an exemplary syntax of WM_component_descriptor( ).

Referring to FIG. 29, 8-bit description_tag is the field of a description tag that identifies each descriptor. Eight-bit description length is a field indicating the byte length of a descriptor. Eight-bit watermark_service_type is type information indicating whether the watermark service is valid.

FIG. 30 illustrates exemplary values of watermark_service_type. Referring to FIG. 30, in a case where watermark_service_type is "0x00," it indicates that the watermark service is unavailable, that is, invalid. Meanwhile, in a case where watermark_service_type is "0x01," it indicates that the watermark service is available, that is, valid.

It should be noted that watermark_service_type having a value between "0x02" and "0xff" is regarded as a reserved region for future use.

As described above, when the second system layer transmission method is used, the watermark information indicating whether the watermark service is valid is inserted into the PMT of PSI compliant with MPEG2-TS, and then transmitted.

The third embodiment has been described above. In the third embodiment, the transmission apparatus 10 inserts the watermark information into control information compliant, for example, with ATSC 3.0 or MPEG2-TS, and transmits the watermark information by using the system layer. Then, on the basis of the watermark information transmitted by using the system layer, the reception apparatus 20 is able to determine whether the watermark service is valid, and detect a watermark.

Consequently, the reception apparatus 20 is able to determine whether the watermark service is valid, and detect a watermark, merely on the basis of the watermark information included in the control information, without having to additionally incorporate special functions (e.g., arithmetic circuit or arithmetic unit) for detecting a watermark. As a result, the reception apparatus 20 is able to achieve watermark detection more easily.

The third embodiment has been described above on the assumption that the adopted transmission method using the system layer causes the watermark information to be included in a signaling compliant with ATSC 3.0 (e.g., USBD, S-TSID, or other metadata) or in the PMT of PSI compliant with MPEG2-TS. However, the watermark information may alternatively be included in control information compliant with a standard other than ATSC 3.0 or MPEG2-TS.

3. Processing Steps at Transmitting and Receiving Ends

Transmission and reception processing steps performed by the transmission system 1 depicted in FIG. 1 will now be described with reference to the flowchart of FIG. 31.

Referring to FIG. 31, it should be noted that steps S101 to S103 are performed by the transmission apparatus 10, and that steps S201 to S204 are performed by the reception apparatus 20.

In step S101, the watermark information generation section 152 performs a process of generating the watermark information.

Here, the watermark information generation section 152 controls the video processing section 113, the audio processing section 115, or the control information processing section 117 so as to perform a process of including the watermark information in any one of the audio layer, the video layer, or the system layer.

In a case where the audio layer is used in the above instance, the watermark information is inserted, for example, into the metadata region or user data region of audio data compliant with MPEG-H 3D Audio.

Meanwhile, in a case where the video layer is used, the watermark information is inserted, for example, into the user data region of video data compliant with MPEG-2, MPEG4-AVC, or HEVC. In a case where the system layer is used, the watermark information is inserted, for example, into the control information compliant with ATSC 3.0 or MPEG2-TS.

In step S102, components and control information are processed.

Here, the video processing section 113 performs a process, for example, of encoding video data. Further, the audio processing section 115 performs a process, for example, of encoding audio data. Furthermore, the control information processing section 117 processes the control information.

In a case where the watermark service is to be transmitted by using a video stream in the above instance, the watermark generation section 151 controls the video processing section 113 so as to include a video watermark in the video stream.

Meanwhile, in a case where the watermark service is to be transmitted by using an audio stream, the watermark generation section 151 controls the audio processing section 115 so as to include an audio watermark in the audio stream.

In the case where the watermark service is to be transmitted by using a video stream or an audio stream, it should be noted that, in the processing in step S101, the watermark information generation section 152 generates watermark information indicating the validity of the watermark service, and includes the generated watermark information in any one of the audio layer, the video layer, or the system layer.

In step S103, the transmission section 119 transmits a broadcast signal that includes streams obtained in the processing in steps S101 and S102.

In step S201, the reception section 214 receives the broadcast signal, which is transmitted from the transmission apparatus 10, through the antenna 231.

In step S202, the watermark information acquisition section 251 performs a process of acquiring the watermark information.

Here, as the watermark information is inserted into any one of the audio layer, the video layer, or the system layer, the watermark information acquisition section 251 extracts the watermark information from the layer into which the watermark information is inserted.

In a case where the watermark information is to be transmitted by using the audio layer in the above instance, the watermark information acquisition section 251 extracts the watermark information that is inserted, for example, into the metadata region or user data region of audio data compliant with MPEG-H 3D Audio or the like.

Meanwhile, in a case where the watermark information is to be transmitted by using the video layer, the watermark information acquisition section 251 extracts the watermark information that is inserted, for example, into the user data region of video data compliant with MPEG-2, MPEG4-AVC, or HEVC or the like. In a case where the watermark information is to be transmitted by using the system layer, the watermark information acquisition section 251 extracts the watermark information that is inserted, for example, into the control information compliant with ATSC 3.0 or MPEG2-TS.

In step S203, on the basis of the watermark information acquired in the processing in step S202, the watermark detection section 252 determines whether the watermark service is valid.

In a case where the watermark service is determined to be valid in step S203, processing proceeds to step S204. In step S204, the watermark detection section 252 performs a process of detecting a watermark. Further, in this instance, the reception apparatus 20 not supporting watermarks is allowed to erase a watermark that obstructs viewing (S204).

Here, in a case where the watermark service is to be transmitted by using a video stream, the watermark detection section 252 controls the video processing section 113 on the basis of the watermark information so as to perform a process of detecting a video watermark included in the video stream.

Meanwhile, in a case where the watermark service is to be transmitted by using an audio stream, the watermark detection section 252 controls the audio processing section 218 so as to perform a process of detecting an audio watermark included in the audio stream.

Conversely, in a case where the watermark service is determined to be invalid in step S203, processing proceeds to step S205. If a watermark exists in this case, the existing watermark may be erased (S205). In other words, when the watermark service is invalid, the reception apparatus 20 does not perform a watermark detection process (S204) because the process of detecting a watermark is not necessary. Upon completion of step S204 or S205, the above-described transmission and reception process comes to an end.

As described above, the reception apparatus 20 is able to determine whether the watermark service is valid, and detect a watermark in a case where the watermark service is valid, merely on the basis of the watermark information included in video data, audio data, or control information, without having to implement special functions (e.g., arithmetic circuit or arithmetic unit) for watermark detecting. As a result, the reception apparatus 20 is able to achieve watermark detection more easily.

The transmission and reception processing steps have been described above.

4. Exemplary Modifications (Exemplary Broadcasting Methods)

The foregoing description assumes that ATSC (particularly ATSC 3.0), which is adopted in the U.S. and other countries, is used as a broadcasting method for broadcast services. However, the present technology may also be applied, for example, to ISDB (Integrated Services Digital Broadcasting), which is a broadcasting method adopted in Japan and other countries, and to DVB (Digital Video Broadcasting), which is a broadcasting method adopted in various European countries and other countries.

Further, not only broadcast transmission paths for terrestrial broadcasting, satellite broadcasting using, for example, a broadcasting satellite (BS: Broadcasting Satellite) or a communications satellite (CS: Communications Satellite), and cable broadcasting such as a cable television (CATV) broadcasting, but also communication transmission paths, for example, for, IPTV (Internet Protocol TV) networks, the Internet, and telephone networks may be used as the transmission path 30 (FIG. 1) for delivering broadcast services (services).

It should be noted that, in the transmission system 1 depicted in FIG. 1, an exemplary configuration in which the transmission apparatus 10 (FIG. 2) solely includes the multiplexer 118, which performs a stream multiplexing process, and the transmission section 119, which performs, for example, a modulation process, has been illustrated. However, a common digital broadcasting system is configured such that the multiplexer 118 and the transmission section 119 are installed at different locations and connected through a predetermined interface (I/F). For example, a first apparatus including the multiplexer 118 is installed in a facility within a broadcasting station, whereas a second apparatus including the transmission section 119 is installed in a facility within a transmitting station.

Further, the foregoing description assumes that the control information compliant with ATSC 3.0 or MPEG2-TS is transmitted by using the system layer. However, it can be said that the control information is transmitted by using a container formatted in compliance with ATSC 3.0 or MPEG2-TS. Therefore, it can be said that the aforementioned system layer is a container layer. Here, the container may be formatted in compliance with MP4, which is used, for example, for Internet distribution, or formatted in a manner other than those mentioned above.

(Alternative Exemplary Configurations of Reception Apparatus)

Meanwhile, the foregoing description assumes that the reception apparatus 20 is a fixed receiver such as a television receiver or a mobile receiver such as a smartphone. However, the reception apparatus 20 may alternatively be a wearable computer such as a head-mounted display (HMD: Head Mounted Display). Further, the reception apparatus 20 may alternatively be a vehicle-mounted television or other apparatus mounted in a vehicle, for example. In other words, the reception apparatus 20 may be any apparatus capable of reproducing and recording content.

(Other)

It should be noted that names used in this document are merely examples and in reality, different names may be used. However, such name differences are superficial differences, and do not represent substantial differences between named targets.

For example, the above-described control information, such as USBD and S-TSID, may be named differently. Further, in a case where the control information is written in XML or other markup language, the names of relevant elements and attributes are merely examples, and the relevant elements and attributes may be named differently. Moreover, for example, MPEG4-AVC may also be referred to as "H.264," and HEVC may also be referred to as "H.265."

5. Computer Configuration

The above-described series of processing steps (e.g., the transmission and reception processing steps depicted in FIG. 31) may be performed by hardware or software. When the series of processing steps is to be performed by software, a program constituting the software is installed on a computer. FIG. 32 is a block diagram illustrating an exemplary configuration of computer hardware that executes the program to perform the above-described series of processing steps.

In the computer 1000, a CPU (Central Processing Unit) 1001, a ROM (Read Only Memory) 1002, and a RAM (Random Access Memory) 1003 are interconnected by a bus 1004. The bus 1004 is further connected to an input/output interface 1005. The input/output interface 1005 is connected to an input section 1006, an output section 1007, a recording section 1008, a communication section 1009, and a drive 1010.

The input section 1006 includes, for example, a keyboard, a mouse, and a microphone. The output section 1007 includes, for example, a display and a speaker. The recording section 1008 includes, for example, a hard disk and a nonvolatile memory. The communication section 1009 includes, for example, a network interface. The drive 1010 drives a removable recording medium 1011, such as a magnetic disk, an optical disk, a magneto-optical disk, or a semiconductor memory.

The computer 1000 configured as described above performs the above-described series of processing steps by allowing the CPU 1001 to load the program, which is recorded in the ROM 1002 or the recording section 1008, into the RAM 1003 through the input/output interface 1005 and the bus 1004, and to execute the loaded program.

The program to be executed by the computer 1000 (CPU 1001) may be recorded, for example, on the removable recording medium 1011, which is a package medium or the like, and then supplied. Alternatively, the program may be supplied through a wired or wireless transmission medium such as a local area network, the Internet, or digital satellite broadcasting system.

The computer 1000 installs the program in the recording section 1008 through the input/output interface 1005 when the removable recording medium 1011 on which the program is recorded is inserted into the drive 1010. Alternatively, the program may be received by the communication section 1009 through a wired or wireless transmission medium and installed in the recording section 1008. Another alternative is to preinstall the program in the ROM 1002 or the recording section 1008.

Here, the processing steps depicted in this document, which are performed by the computer in accordance with the program, are not necessarily required to be performed in the chronological order depicted in the flowchart. In other words, the processing steps performed by the computer in accordance with the program include processing steps performed in parallel or individually (e.g., parallel processing steps or object-based processing steps). Further, the program may be processed by one computer (processor) or distributively processed by a plurality of computers.

It should be noted that the embodiments according to the present technology are not limited to the above-described ones. It is to be understood that the embodiments may variously be modified without departing from the spirit of the present technology.

Further, the present technology may adopt the following configurations.

(1)

A transmission apparatus including:

a generation section that generates watermark information for detecting a watermark; and a transmission section that transmits a broadcast signal including the watermark and the watermark information.

(2)

The transmission apparatus according to (1) above, in which the watermark is included in an audio stream or video stream transmitted as the broadcast signal; and the watermark information is included in any one of a layer of the audio stream, a layer of the video stream, or a layer of system information.

(3)

The transmission apparatus according to (2) above, in which the watermark information is inserted into a metadata region of audio data included in the audio stream.

(4)

The transmission apparatus according to (2) above, in which the watermark information is inserted into a user data region of audio data included in the audio stream.

(5)

The transmission apparatus according to (3) or (4) above, in which the audio data is compliant with MPEG-H 3D Audio.

(6)

The transmission apparatus according to (2) above, in which the watermark information is inserted into a user data region of video data included in the video stream.

(7)

The transmission apparatus according to (6) above, in which the video data is compliant with MPEG-2, MPEG4-AVC (Advanced Video Coding), or HEVC (High Efficiency Video Coding).

(8)

The transmission apparatus according to (2) above, in which the watermark information is included in control information transmitted as the system information.

(9)

The transmission apparatus according to (8) above, in which the control information is compliant with ATSC (Advanced Television Systems Committee) 3.0 or MPEG2-TS (Transport Stream).

(10)

A transmission method of a transmission apparatus, the transmission method including:

causing the transmission apparatus to generate watermark information for detecting a watermark; and causing the transmission apparatus to transmit a broadcast signal including the watermark and the watermark information.

(11)

A reception apparatus including:

a reception section that receives a broadcast signal including a watermark and watermark information for detecting the watermark; and a detection section that detects, on the basis of the watermark information, the watermark included in the broadcast signal.

(12)

The reception apparatus according to (11) above, in which the watermark is included in an audio stream or video stream transmitted as the broadcast signal; and the watermark information is included in any one of a layer of the audio stream, a layer of the video stream, or a layer of system information.

(13)

The reception apparatus according to (12) above, in which the watermark information is inserted into a metadata region of audio data included in the audio stream.

(14)

The reception apparatus according to (12) above, in which the watermark information is inserted into a user data region of audio data included in the audio stream.

(15)

The reception apparatus according to (13) or (14) above, in which the audio data is compliant with MPEG-H 3D Audio.

(16)

The reception apparatus according to (12) above, in which the watermark information is inserted into a user data region of video data included in the video stream.

(17)

The reception apparatus according to (16) above, in which the video data is compliant with MPEG-2, MPEG4-AVC, or HEVC.

(18)

The reception apparatus according to (12) above, in which the watermark information is included in control information transmitted as the system information.

(19)

The reception apparatus according to (18) above, in which the control information is compliant with ATSC 3.0 or MPEG2-TS.

(20)

A reception method of a reception apparatus, the reception method including:

causing the reception apparatus to receive a broadcast signal including a watermark and watermark information for detecting the watermark; and causing the reception apparatus to detect, on the basis of the watermark information, the watermark included in the broadcast signal.

REFERENCE SIGNS LIST

1 Transmission system
10 Transmission apparatus
20 Reception apparatus
30 Transmission path
111 Control section
113 Video processing section
115 Audio processing section
117 Control information processing section
119 Transmission section
151 Watermark generation section
152 Watermark information generation section
211 Control section
214 Reception section
216 Video processing section
218 Audio processing section
251 Watermark information acquisition section
252 Watermark detection section
1000 Computer
1001 CPU

The invention claimed is:

1. A transmission apparatus comprising:
circuitry configured to:
generate a watermark inclusion flag indicating whether a watermark is included in an audio stream of a broadcast signal; and
transmit the broadcast signal including the watermark inclusion flag, wherein
the watermark inclusion flag is included in a layer of the audio stream,
the audio stream includes the watermark when the watermark inclusion flag indicates that the watermark is included in the audio stream, and
the audio stream does not include the watermark when the watermark inclusion flag indicates that the watermark is not included in the audio stream.

2. The transmission apparatus according to claim 1, wherein the watermark inclusion flag is inserted into a metadata region of audio data included in the audio stream.

3. The transmission apparatus according to claim 1, wherein audio data of the audio stream is compliant with MPEG-H 3D Audio.

4. The transmission apparatus according to claim 1, wherein the watermark inclusion flag is inserted into a user data region of audio data included in the audio stream.

5. A transmission method of a transmission apparatus, the transmission method comprising:
generating a watermark inclusion flag indicating whether a watermark is included in an audio stream of a broadcast signal; and
transmitting the broadcast signal including the watermark inclusion flag, wherein
the watermark inclusion flag is included in a layer of the audio stream,
the audio stream includes the watermark when the watermark inclusion flag indicates that the watermark is included in the audio stream, and
the audio stream does not include the watermark when the watermark inclusion flag indicates that the watermark is not included in the audio stream.

6. A reception apparatus comprising:
circuitry configured to:
receive a broadcast signal including a watermark inclusion flag indicating whether a watermark is included in an audio stream of the broadcast signal, the watermark inclusion flag being included in a layer of the audio stream; and
process the watermark when the watermark inclusion flag indicates that the watermark is included in the audio stream.

7. The reception apparatus according to claim 6, wherein the watermark inclusion flag is inserted into a metadata region of audio data included in the audio stream.

8. The reception apparatus according to claim 6, wherein audio data of the audio stream is compliant with MPEG-H 3D Audio.

9. The reception apparatus according to claim 6, wherein the watermark inclusion flag is inserted into a user data region of audio data included in the audio stream.

10. The reception apparatus according to claim 6, further comprising:
a display and a speaker,
wherein the circuitry is configured to:
extract video data and audio data from the broadcast signal;
process the video data and the audio data to obtain processed video data and processed audio data; and
output the processed video data to the display and the processed audio data to the speaker.

11. The reception apparatus according to claim 6, wherein process the watermark when the watermark inclusion flag indicates that the watermark is included in the audio stream includes detecting the watermark.

12. The reception apparatus according to claim 6, wherein the circuitry is configured to proceed without detection of the watermark when the watermark inclusion flag indicates that the watermark is not included in the audio stream.

13. A reception method of a reception apparatus, the reception method comprising:
receiving a broadcast signal including a watermark inclusion flag indicating whether a watermark is included in an audio stream of the broadcast signal, the watermark inclusion flag being included in a layer of the audio stream; and
processing the watermark when the watermark inclusion flag indicates that the watermark is included in the audio stream.

14. The reception method according to claim 13, wherein the watermark inclusion flag is inserted into a metadata region of audio data included in the audio stream.

15. The reception method according to claim 13, wherein the watermark inclusion flag is inserted into a user data region of audio data included in the audio stream.

16. The reception method according to claim 13, wherein audio data of the audio stream is compliant with MPEG-H 3D Audio.

* * * * *